United States Patent
Kang et al.

(10) Patent No.: US 12,492,815 B2
(45) Date of Patent: Dec. 9, 2025

(54) APPARATUS AND PROCESS FOR OXIDANT FORMATION

(71) Applicant: Air Products and Chemicals, Inc., Allentown, PA (US)

(72) Inventors: Kai Kang, Allentown, PA (US); Xiaoyi He, Orefield, PA (US); Eugene S Genkin, Allentown, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 0 days.

(21) Appl. No.: 18/498,564

(22) Filed: Oct. 31, 2023

(65) Prior Publication Data
US 2025/0027003 A1 Jan. 23, 2025

Related U.S. Application Data

(60) Provisional application No. 63/527,810, filed on Jul. 19, 2023.

(51) Int. Cl.
*F23L 7/00* (2006.01)
*B01D 53/22* (2006.01)
(Continued)

(52) U.S. Cl.
CPC ............ *F23L 7/00* (2013.01); *B01D 53/229* (2013.01); *B01F 23/19* (2022.01);
(Continued)

(58) Field of Classification Search
CPC .... F23L 7/00; F23L 7/007; C01B 3/36; C01B 3/501; C01B 3/384; C01B 3/38;
(Continued)

(56) References Cited

U.S. PATENT DOCUMENTS

| 4,495,874 A | 1/1985 | Greskovich et al. |
| 5,826,521 A | 10/1998 | Schumann et al. |

(Continued)

FOREIGN PATENT DOCUMENTS

| CN | 110220378 A | 9/2019 |
| DE | 102007022168 A1 | 11/2008 |

(Continued)

OTHER PUBLICATIONS

Allam Rodney, et al; "The Oxyfuel Baseline: Revamping Heaters and Boilers to Oxyfiring by Cryogenic Air Separation and Flue Gas Recycle"; Carbon Dioxide Capture for Storage in Deep Geologic Formations, vol. 1;Chap. 26; pp. 451-475; DC Thomas and S.M. Benson; Elsevier Ltd. 2005.

(Continued)

*Primary Examiner* — Alfred Basichas
(74) *Attorney, Agent, or Firm* — DaLesia H. Boyd; Jason M. Ploeger

(57) ABSTRACT

An apparatus and process for oxidant formation can be configured to facilitate improved mixing of for formation of an oxidant. Embodiments can be configured so conduits having a relatively large aspect ratio (e.g., 1.5 to 5 or 1.5 to over 5) can be utilized for improved gas mixing even in situations in which the carrier gas is at a relatively low pressure. Embodiments can also facilitate low nitrogen oxide formation combustion. Some embodiments can additionally provide improved carbon capture.

11 Claims, 9 Drawing Sheets

(51) Int. Cl.
  *B01F 23/10* (2022.01)
  *B01F 35/21* (2022.01)
  *B01F 35/221* (2022.01)
  *C01B 3/36* (2006.01)
  *C01B 3/38* (2006.01)
  *C01B 3/50* (2006.01)
  *C10L 3/00* (2006.01)
  *B01F 101/00* (2022.01)

(52) U.S. Cl.
  CPC .... *B01F 35/21112* (2022.01); *B01F 35/2132* (2022.01); *B01F 35/2214* (2022.01); *B01F 35/2217* (2022.01); *C01B 3/36* (2013.01); *C01B 3/38* (2013.01); *C01B 3/501* (2013.01); *C10L 3/003* (2013.01); *B01D 2256/22* (2013.01); *B01D 2257/504* (2013.01); *B01F 2101/501* (2022.01); *C01B 2203/0216* (2013.01); *C01B 2203/0233* (2013.01); *C01B 2203/0255* (2013.01); *C01B 2203/041* (2013.01); *C01B 2203/0475* (2013.01); *C01B 2203/049* (2013.01); *C01B 2203/0811* (2013.01); *C01B 2203/1241* (2013.01); *C01B 2203/1614* (2013.01); *C01B 2203/1633* (2013.01); *C01B 2203/1695* (2013.01); *C10L 2230/22* (2013.01); *C10L 2290/141* (2013.01); *F23L 2900/07001* (2013.01)

(58) Field of Classification Search
  CPC ............ B01F 35/2214; B01F 35/21112; B01F 35/2217; B01F 23/19; B01F 35/2132; F23C 9/00; C10L 3/003; B01D 53/229; B01D 53/1475
  See application file for complete search history.

(56) References Cited

U.S. PATENT DOCUMENTS

| | | | |
|---|---|---|---|
| 7,303,388 B2 | 12/2007 | Joshi et al. | |
| 7,591,992 B2 | 9/2009 | Peng et al. | |
| 7,850,763 B2 | 12/2010 | White et al. | |
| 7,850,944 B2 | 12/2010 | Genkin et al. | |
| 8,496,908 B1 | 7/2013 | Genkin et al. | |
| 8,715,617 B2 | 5/2014 | Genkin et al. | |
| 8,808,425 B2 | 8/2014 | Genkin et al. | |
| 9,458,013 B1 | 10/2016 | Sicinski et al. | |
| 9,513,000 B2 | 12/2016 | Marumoto et al. | |
| 11,592,178 B2 | 2/2023 | D'Agostini et al. | |
| 2011/0011315 A1 | 1/2011 | Hayashi et al. | |
| 2012/0024206 A1 | 2/2012 | Varonen | |
| 2013/0156685 A1 | 6/2013 | Vauk et al. | |
| 2014/0124705 A1 | 5/2014 | Andersen | |
| 2014/0208994 A1* | 7/2014 | Cohen | B01F 25/31331 110/215 |
| 2014/0264177 A1 | 9/2014 | Meissner et al. | |
| 2021/0071861 A1 | 3/2021 | Beldon et al. | |

FOREIGN PATENT DOCUMENTS

| | | |
|---|---|---|
| EP | 2500642 A1 | 9/2012 |
| EP | 2703717 A1 | 3/2014 |
| EP | 2759335 A2 | 7/2014 |
| EP | 2857749 A1 | 4/2015 |
| EP | 2674394 B1 | 3/2016 |
| EP | 3771688 A1 | 2/2021 |
| EP | 4098610 A1 | 12/2022 |
| WO | 2008142654 A2 | 11/2008 |
| WO | 2022131925 A1 | 6/2022 |

OTHER PUBLICATIONS

PCT/US2023/036929, ISRWO; Mar. 20, 2024; "Apparatus and Process for Reduced Formation of Nitrogen Oxides During Combustion".
PCT/US2023/036931, ISRWO; Apr. 2, 2024; "Apparatus and Process for Oxidant Formation".
PCT/US2023/036940, ISRWO; Mar. 22, 2024; "Control System for an Apparatus for Steam Reforming and Process for Controlling an Apparatus for Steam Reforming".

* cited by examiner

APPARATUS AND PROCESS FOR OXIDANT FORMATION

CROSS-REFERENCE TO RELATED APPLICATIONS

The present application claims priority to U.S. Provisional Patent Application No. 63/527,810, filed on Jul. 19, 2023.

FIELD

The present innovation relates to processes and apparatuses for forming an oxidant to feed to a combustion device to facilitate combustion of a fuel. For example, some embodiments can be configured for forming and using synthetic air or oxygen enriched air as an oxidant for combustion of a fuel.

BACKGROUND

A combustion process can be utilized in various industrial settings. For example, a combustion process can be utilized in a process to generate electricity, utilized in a gasification process, utilized in a steam/hydrocarbon reforming process, utilized for furnace operations to heat a material or melt a material, utilized in a boiler operation, or can be utilized in a process to generate power. Examples of combustion processes and examples of fuels and oxidant flows that can be used in combustion processes are disclosed in U.S. Pat. Nos. 11,592,178, 8,808,425, 8,715,617, 8,496,908, 7,850,763, 7,303,388, and 4,495,874 and Chinese Patent Application Publication No. CN 110220378.

SUMMARY

Rectangular duct geometry can be a challenging conduit size to utilize for mixing of gas. We have found that this can particularly be the case for ducts having a relatively large size (e.g. duct aspect ratios of 1.5 to 5 or a duct aspect ratio of greater than or equal to 3) in which there is a relatively low pressure carrier gas (e.g. a low pressure carrier gas to be mixed with another gas injected into the carrier gas where the carrier gas pressure is between 5 inches of water and 50 inches water, or between 1.2442 kPa and 12.442 kPa).

A duct aspect ratio is the ratio of a duct's height relative to its width (e.g. a duct aspect ratio of 4 is a sizing in which a duct's width is 4 times larger than the duct's height. For example, a duct having a height of 1 meter and a width of 4 meters has a duct aspect ratio of 4, etc.).

This challenge can be exacerbated by a common situation in which these types of sized ducts may only have a relatively small length for providing mixed gases for formation of a gas to be fed to a combustion device as an oxidant, for example. In many situations, there may only be a short section of a duct for mixing of gases that can be provided for forming a desired oxidant gas mixture.

Further, good mixing can be made more difficult based on a ratio of the fluid to be injected into another fluid for being mixed to form an oxidant. For instance in situations where the injected fluid mass flow to carrier fluid mass flow ratio is between 0.1 to 1, the short length and large aspect ratio of a duct can make good mixing very hard to achieve. This can be particularly true for rectangular shaped ducts.

We surprisingly found that a new type of oxidant mixing device can be provided to facilitate formation of an oxidant for feeding to a combustion device to facilitate combustion within the combustion chamber of that device. The mixing device can be configured to provide good mixing of oxygen to be injected into a carrier stream. In some embodiments, the carrier gas stream can be air, flue gas, or a mixture of flue gas and air. Embodiments can be configured so that a wide range of injection fluid to carrier stream fluid mass flow ratios can be supported for forming a desired oxidant and that such mixing for formation of the oxidant can be provided over a relatively short duct length. Further, some embodiments can facilitate an improved mixing that prevents side portions of the formed oxidant form having a higher oxygen concentration than a middle region of the flow, which can help protect conduit sidewalls and provide improved operation and performance that can also help improve the life or degradation experienced by the conduits through which the formed oxidant passes.

We have also found that embodiments of our mixing device can help provide improved combustion processing for industrial fired heating applications and other combustion applications that can provide reduced nitrogen oxide formation. Some embodiments can be utilized to also help improve carbon capture to provide a substantial reduction in carbon dioxide emission as well.

For instance, industrial fired heaters can emit a high amount of nitrogen oxides (which can also be referred to as $NO_x$, NOx, or NOX). Such heaters can utilize one or more burners that can emit a fuel and/or an oxidant for being combusted in a combustor or combustion chamber to generate heat. The resulting combustion can often result in substantial and undesired amount of NOx, such as NO, $NO_2$, $N_2O$, $N_2O_3$, and other nitrogen oxides. Carbon dioxide ($CO_2$) is also formed during the combustion process when a hydrocarbon fuel is being combusted.

Often, a catalytic reduction, advanced burner configuration, or both are employed to try and reduce NOx emissions. However, catalytic reduction often requires use of ammonia ($NH_3$) or urea ($CH_4N_2O$) and can require a large scrubber bed and can require a significant increase in operational costs. Also, the use of ammonia can result in the ammonia slipping into flue gas or other fluid, which can pose equipment degradation issues and other problems. Advanced burners can often also require use of increased capital costs associated with the installation and use of such burners. These approaches can also reduce operational flexibility and can require combustion processes to have to incur more maintenance operations.

We determined that reduced NOx formation from combustion of a hydrocarbon fuel can be provided without the use of catalytic reduction and without use of an advanced burner via providing of an oxidant formed by use of an embodiment of our mixing device. While an advanced burner could be utilized due to other design requirements, one is not needed to account for reducing NOx emissions in some embodiments of our apparatus and process for combustion of a fuel with reduced NOx emissions that can utilize an embodiment of our oxidant mixing device. Further, we have surprisingly found that embodiments can be provided so that a substantial reduction in CO2 emissions can also be provided via implementation of different types of carbon capture equipment.

For instance, embodiments of our oxidant mixing device have been surprisingly found to be able to form oxidant streams that can be fed to a combustion device for combustion in a way that helps drastically reduce NOx formation that can occur during combustion and, consequently, also significantly reduce NOx emissions. For instance, we have found that some embodiments of a process and/or an apparatus that can utilize an embodiment of our oxidant mixing device can provide an 80% to 98% reduction in NOx formation or at least a 75% reduction in NOx formation from the combustion of fuel. We have found that this type of significant NOx reduction can be provided regardless of the type of burner or burner assembly that may be used in the combustion process.

In a first aspect, an apparatus for oxidant formation can include a mixing device positionable and configured to receive a carrier gas from at least one source of gas and/or flue gas recycled from a combustion device. The mixing device can also be positionable and configured to receive oxygen from a source of oxygen for injecting the oxygen into the carrier gas to form an oxidant for feeding to the combustion device. The mixing device can include a plurality of injection devices positioned within a conduit of the mixing device. The injection devices can be positionable downstream of at least one flow conditioning device such that the carrier gas is passable through the at least one flow conditioning device before passing along the injection devices. The injection devices can be positioned and configured to inject the oxygen into the carrier gas to form the oxidant.

In some embodiments, the formed oxidant can be oxygen enriched air. In other embodiments, the formed oxidant can be synthetic air. Some embodiments of the formed synthetic air can include a synthetic air having a relatively low nitrogen (N2) content (e.g. an N2 content of between 25 mole percent N2 and 0 mole percent N2, etc.). Some embodiments of the apparatus can be configured as an apparatus for reduced nitrogen oxide formation during combustion. For example, some embodiments can be configured to form an oxidant for combustion of a fuel such that nitrogen oxide formation in flue gas formed from the combustion of the fuel can be below 6.1 mg/Nm$^3$, where Nm$^3$ is a normal cubic meter (e.g. between 6.1 mg/Nm$^3$ and greater than 0 mg/Nm$^3$). As another example, some embodiments can be configured to form an oxidant for combustion of a fuel such that nitrogen oxide formation in flue gas formed from the combustion can be below 2.5 ppm (e.g. between 0 ppm and 2.5 ppm).

In a second aspect, the injection devices can include a central region of injection devices, a first outer region of injection devices positioned between the central region of the injection devices and a first sidewall of the conduit and a second outer region of injection devices positioned between the central region of the injection devices and a second sidewall of the conduit. The central region of injection devices can be positioned between the first outer region of injection devices and the second outer region of injection devices. The plurality of injection devices can be a staggered configuration within the conduit of the mixing device or can be in another type of configuration in the conduit of the mixing device.

In some embodiments, the first and second sidewalls can be spaced apart from each other by a bottom wall and a top wall that is opposite the bottom wall. The top wall and bottom wall can each extend along a width of the conduit of the mixing device between the first side wall and the second side wall to define a mixing device chamber for the mixing of oxygen with the carrier gas to form the oxidant, for example. In such embodiments, the shape of the conduit of the mixing device can be rectangular shaped or polygonal shaped.

In some embodiments, each of the injection devices of the central region of injection devices can be configured to inject a mass flow rate of oxygen into the carrier gas via a central region injection rate. Each of the injection devices of the first outer region of injection devices can configured to inject a mass flow rate of oxygen into the carrier gas via an outer region injection rate and each of the injection devices of the second outer region of injection devices can also be configured to inject a mass flow rate of oxygen into the carrier gas via the outer region injection rate. In some implementations, the central region injection rate can be the same as the outer region injection rate. In other embodiments, the central region injection rate can differ from the outer region injection rate. For instance, the central region injection rate can be at least 5% greater than the outer region injection rate (e.g. greater than 10% or greater than 15%, etc.). As another example, the central region injection rate can be at least 10% greater than the outer region injection rate (e.g. between 10% greater and 30% greater or 10% greater and 35% greater, etc.). As yet another example, the central region injection rate can be at least 20% greater than the outer region injection rate (e.g. between 20% and 35% greater, etc.). As yet another example, the central region injection rate can be between 5% greater than the outer region injection rate and 35% greater than the outer region injection rate.

In some embodiments, the mass flow rate of oxygen injectable into the carrier gas via the central region of injection devices can be between 30% and 60% of an overall mass flow rate of oxygen injectable into the carrier gas. A mass flow rate of oxygen injectable into the carrier gas by the first outer region of injection devices can be between 20% and 40% of the overall mass flow rate of oxygen injectable into the carrier gas and a mass flow rate of oxygen injectable into the carrier gas by the second outer region of injection devices can be between 20% and 40% of the overall mass flow rate of oxygen injectable into the carrier gas. In other embodiments, the mass flow rate of oxygen injectable into the carrier gas by the second outer region of injection devices can be equal to the mass flow rate of oxygen injectable into the carrier gas by the first outer region of injection devices.

In a third aspect, the conduit of the mixing device can have a duct aspect ratio. the duct aspect ratio can be greater than 3 or between 3.5 and 5, for example. In other embodiments, the duct aspect ratio can be between 3 and 6 or greater than 3 and less than 5.

In a fourth aspect, the mixing device can include at least one flow conditioning device. For example, a perforated plate, turning vanes, baffles, tube banks, and/or combinations of these flow conditioning elements can be included as the at least one flow conditioning device. A flow conditioning device can be configured to provide a uniform velocity profile for the carrier gas (e.g. air, flue gas, or a combination of air and flue gas, etc.) in the cross-section of the conduit of the mixing device.

In some embodiments, the at least one flow conditioning device can include a perforated plate positioned within the conduit upstream of the injection devices. The perforated plate can have a thickness and a plurality of holes. Each of the holes can have a hole diameter. A ratio of the thickness of the perforated plate to the hole diameter can be between 0.3 and 1. In some embodiments, the perforated plate can be positioned downstream of a carrier gas flow device or a flow disturbance component (e.g. turns, branches, expansion/contractions, dampers, etc.) at a distance between a value that is equal to half of a height of the conduit and a value that is triple the height of the conduit.

In a fifth aspect, the apparatus of the first aspect can include one or more features of the second aspect, third aspect, and/or fourth aspect. It should also be appreciated that other embodiments can utilize other elements or features. Examples of such other elements or features are provided in the exemplary embodiments discussed herein.

In a sixth aspect, a process for forming an oxidant is provided. The process can include forming an oxidant by mixing carrier gas from at least one source of gas and/or flue gas recycled from a combustion device with oxygen from at least one source of oxygen. The process can also include feeding the formed oxidant to the combustion device as an oxidant for combustion of a fuel in a combustion chamber of the combustion device. The mixing of the carrier gas with the oxygen can be performed via a mixing device. The mixing device can include a plurality of injection devices positioned within a conduit of the mixing device. The injection devices can be positioned and configured to inject the oxygen into the carrier gas to form the oxidant. The injection devices can include a central region of injection devices, a first outer region of injection devices positioned between the central region of the injection devices and a first sidewall of the conduit and a second outer region of injection devices positioned between the central region of the injection devices and a second sidewall of the conduit. The central region of injection devices can be positioned between the first outer region of injection devices and the second outer region of injection devices.

Embodiments of the apparatus for oxidant formation can be utilized in the process. The process can also utilize other steps or features. Some embodiments of the process can be utilized in a process for reduced nitrogen oxide formation during combustion, for example.

In some embodiments of the process, the formed oxidant can be oxygen enriched air. In other embodiments, the formed oxidant can be synthetic air. Some embodiments of the formed synthetic air can include a synthetic air having a relatively low nitrogen (N2) content (e.g. an N2 content of between 25 mole percent N2 and 0 mole percent N2, etc.). Some embodiments of the process can be implemented for reduced nitrogen oxide formation during combustion of a fuel. For example, some embodiments can be configured to form an oxidant for combustion of a fuel such that nitrogen oxide formation in flue gas formed from the combustion of the fuel can be below 6.1 mg/Nm$^3$, where Nm$^3$ is a normal cubic meter (e.g. between 6.1 mg/Nm$^3$ and greater than 0 mg/Nm$^3$). As used herein, Nm$^3$ is a normal cubic meter, which is a volume of gas that occupies 1 cubic meter (m$^3$) under conditions in which the gas is absolutely dry, at a temperature of 0° C. and at an absolute pressure of 1 atm. As another example, some embodiments can be configured to form an oxidant for combustion of a fuel such that nitrogen oxide formation in flue gas formed from the combustion can be below 2.5 ppm (e.g. between 0 ppm and 2.5 ppm).

In a seventh aspect, the mixing of the carrier gas with the oxygen can include injecting a mass flow rate of oxygen into the carrier gas via each of the injection devices of the central region of injection devices at a central region injection rate, injecting a mass flow rate of oxygen into the carrier gas via each of the injection devices of the first outer region of injection devices at an outer region injection rate, and injecting a mass flow rate of oxygen into the carrier gas via each of the injection devices of the second outer region of injection devices at the outer region injection rate. The central region injection rate can be greater than the outer region injection rate (e.g. can be at least 5% greater, 10% greater, 20% greater, etc.) In some embodiments, the central region injection rate can be between 5% greater and 35% greater than the outer region injection rate, for example.

In an eighth aspect, the mixing of the carrier gas with the oxygen can include injecting a mass flow rate of the oxygen into the carrier gas via the central region of injection devices, injecting a mass flow rate of the oxygen into the carrier gas via the first outer region of injection devices, and injecting a mass flow rate of the oxygen into the carrier gas via the second outer region of injection devices. The mass flow rate of oxygen injected via the central region of injection devices can be between 30% and 60% of an overall mass flow rate of the oxygen injected into the carrier gas, the mass flow rate of oxygen injected into the carrier gas by the first outer region of injection devices can between 20% and 40% of the overall mass flow rate of the oxygen injected into the carrier gas, and the mass flow rate of the oxygen injected into the carrier gas by the second outer region of injection devices can be between 20% and 40% of the overall mass flow rate of the oxygen injected into the carrier gas. In some embodiments, the features of the seventh aspect and features of the eighth aspect can be performed simultaneously.

In some embodiments, the mass flow rate of oxygen injected into the carrier gas by each of the injection devices of the second outer region of injection devices can be equal to the mass flow rate of oxygen injected into the carrier gas by each of the injection devices of first outer region of injection devices. Also (or alternatively), the mass flow rate of oxygen injected via each of the injection devices of the central region of injection devices can be at least 20% higher than the mass flow rate of oxygen injected into the carrier gas via each of the injection devices of the first outer region of injection devices and the mass flow rate of oxygen injected via each of the injection devices of the central region of injection devices can also be at least 20% higher than the mass flow rate of oxygen injected into the carrier gas via each of the injection devices of the second outer region of injection devices. In other embodiments, the mass flow rate of the injection devices of the central region of injection devices can differ in other ranges.

In a ninth aspect, the process for forming an oxidant can also include passing the carrier gas through at least one flow conditioning device positioned upstream of the injection devices. In some embodiments, the at least one flow conditioning device can include a perforated plate having a thickness and a plurality of holes wherein each of the holes have a hole diameter. The carrier gas can be passed through the holes in the perforated plate wherein a ratio of the thickness of the perforated plate to the hole diameter is between 0.3 and 1. The perforated plate can be positioned downstream of a carrier gas flow device or a flow disturbance component (e.g. turns, branches, expansion/contractions, dampers, etc.) at a distance between a value that is equal to half of a height of the conduit and a value that is triple the height of the conduit. Embodiments can also include positioning the perforated plate in the conduit of the mixing device upstream of the injection devices.

In a tenth aspect, the process of the sixth aspect can include one or more features of the seventh aspect, eighth aspect, and/or ninth aspect. It should also be appreciated that other embodiments can utilize other elements or features. Examples of such other elements or features are provided in the exemplary embodiments discussed herein.

In an eleventh aspect, a combustion apparatus is provided. Embodiments of the combustion apparatus can utilize an embodiment of the apparatus for oxidant formation. Embodiments of the combustion apparatus can also be configured to implement an embodiment of the process for forming an oxidant and/or an embodiment of a process for apparatus for reduced nitrogen oxide formation during combustion.

For example, in some embodiments the combustion apparatus can include a combustion device and a mixing device positioned and configured to receive a carrier gas from at least one source of gas and/or flue gas recycled from the combustion device. The mixing device can also be positioned and configured to receive oxygen from a source of oxygen for injecting the oxygen into the carrier gas to form an oxidant for feeding to the combustion device. At least one flow conditioning device can be positioned upstream of the mixing device. The mixing device can include a plurality of injection devices positioned within a conduit of the mixing device. The injection devices can be positioned downstream of the at least one flow conditioning device such that the carrier gas is passable through the at least one flow conditioning device before passing along the injection devices. The at least one flow conditioning device can be configured to provide a uniform velocity profile for the carrier gas passed along the injection devices along a cross-section of the conduit of the mixing device. The injection devices can be positioned and configured to inject the oxygen into the carrier gas to form the oxidant. The injection devices can include a central region of injection devices, a first outer region of injection devices positioned between the central region of the injection devices and a first sidewall of the conduit and a second outer region of injection devices positioned between the central region of the injection devices and a second sidewall of the conduit. The central region of injection devices can be positioned between the first outer region of injection devices and the second outer region of injection devices. Each of the injection devices of the central region of injection devices can be configured to inject a mass flow rate of oxygen into the carrier gas via a central region injection rate, each of the injection devices of the first outer region of injection devices can be configured to inject a mass flow rate of oxygen into the carrier gas via an outer region injection rate, and each of the injection devices of the second outer region of injection devices can be configured to inject a mass flow rate of oxygen into the carrier gas via the outer region injection rate. The central region injection rate can be at least 5% greater than the outer region injection rate. Also, a duct aspect ratio of the conduit of the mixing device can be between 3 and 5 (e.g. can be greater than 3 and less than or equal to 4.5, etc.).

Other embodiments of the combustion device can have other features. For example, an oxidant feed conduit can be positioned between the mixing device and a combustion chamber of the combustion device to feed the oxidant to the combustion chamber (e.g. via at least one burner and/or via at least one oxidant inlet of the combustion chamber). The combustion apparatus can be configured for steam reforming, can be configured as a furnace, can be configured as a boiler, or can be configured as another type of apparatus that can utilize combustion of a fuel (e.g. at least one hydrocarbon, methane, pulverized coal, oil, refinery off gas, etc.).

It should be appreciated that embodiments of the process and apparatus can utilize various conduit arrangements and process control elements. The embodiments may utilize sensors (e.g., pressure sensors, temperature sensors, flow rate sensors, concentration sensors, etc.), controllers, valves, piping, and other process control elements. Some embodiments can utilize an automated process control system and/or a distributed control system (DCS), for example. Various different conduit arrangements and process control systems can be utilized to meet a particular set of design criteria.

Other details, objects, and advantages of our apparatus for oxidant formation, process for oxidant formation, combustion apparatus, and methods of making and using the same will become apparent as the following description of certain exemplary embodiments thereof proceeds.

BRIEF DESCRIPTION OF THE DRAWINGS

Exemplary embodiments of our apparatus for oxidant formation, process for oxidant formation, process for reduced nitrogen oxide formation during combustion, apparatus for reduced nitrogen oxide formation during combustion, and methods of making and using the same are shown in the drawings included herewith. It should be understood that like reference characters used in the drawings may identify like components.

DETAILED DESCRIPTION

Figure 1:
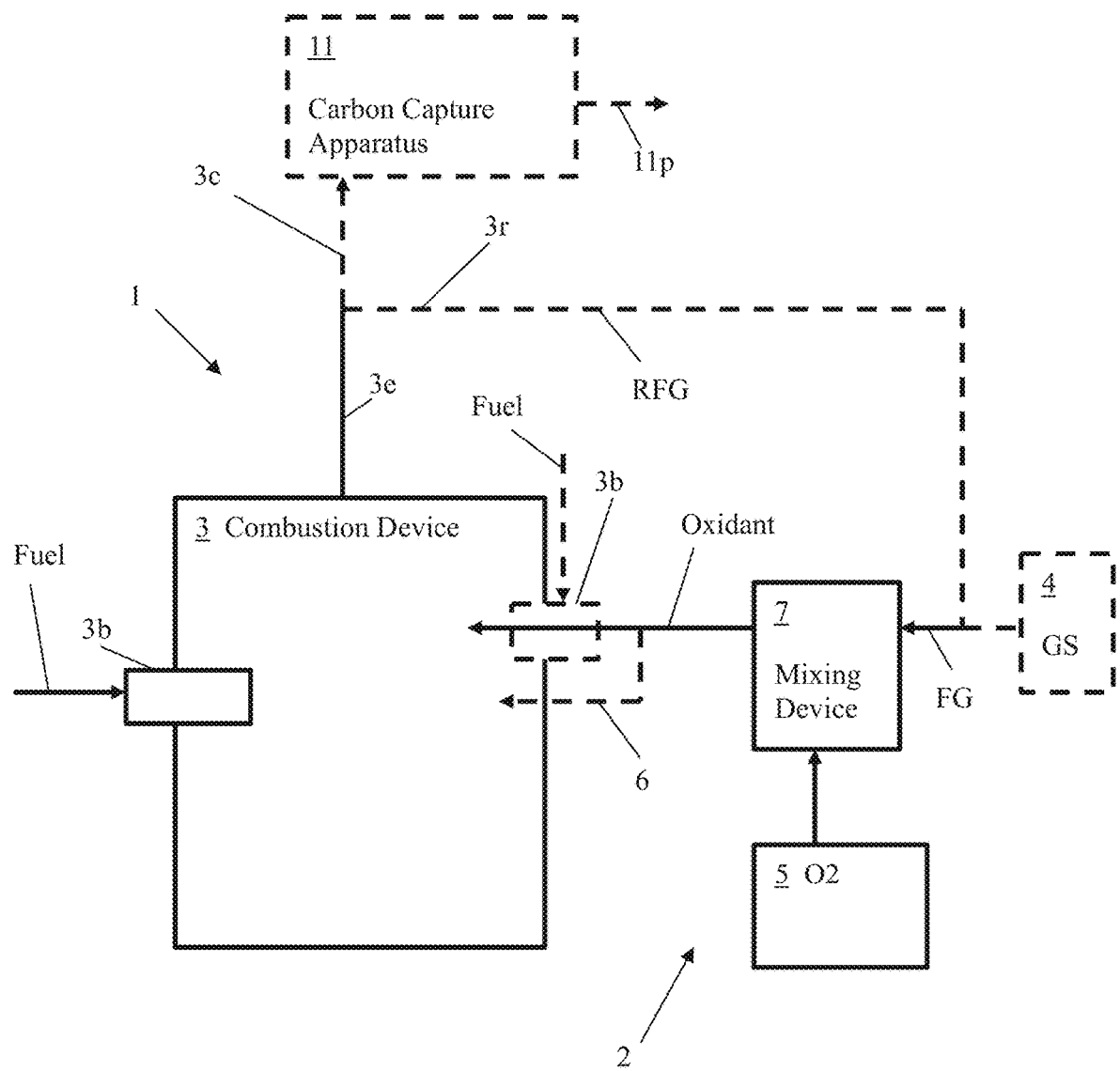
FIG. 1 is a block diagram of a first exemplary embodiment of an apparatus for reduced nitrogen oxide formation during combustion that can include a first exemplary embodiment of our apparatus for oxidant formation.
Figure 2:
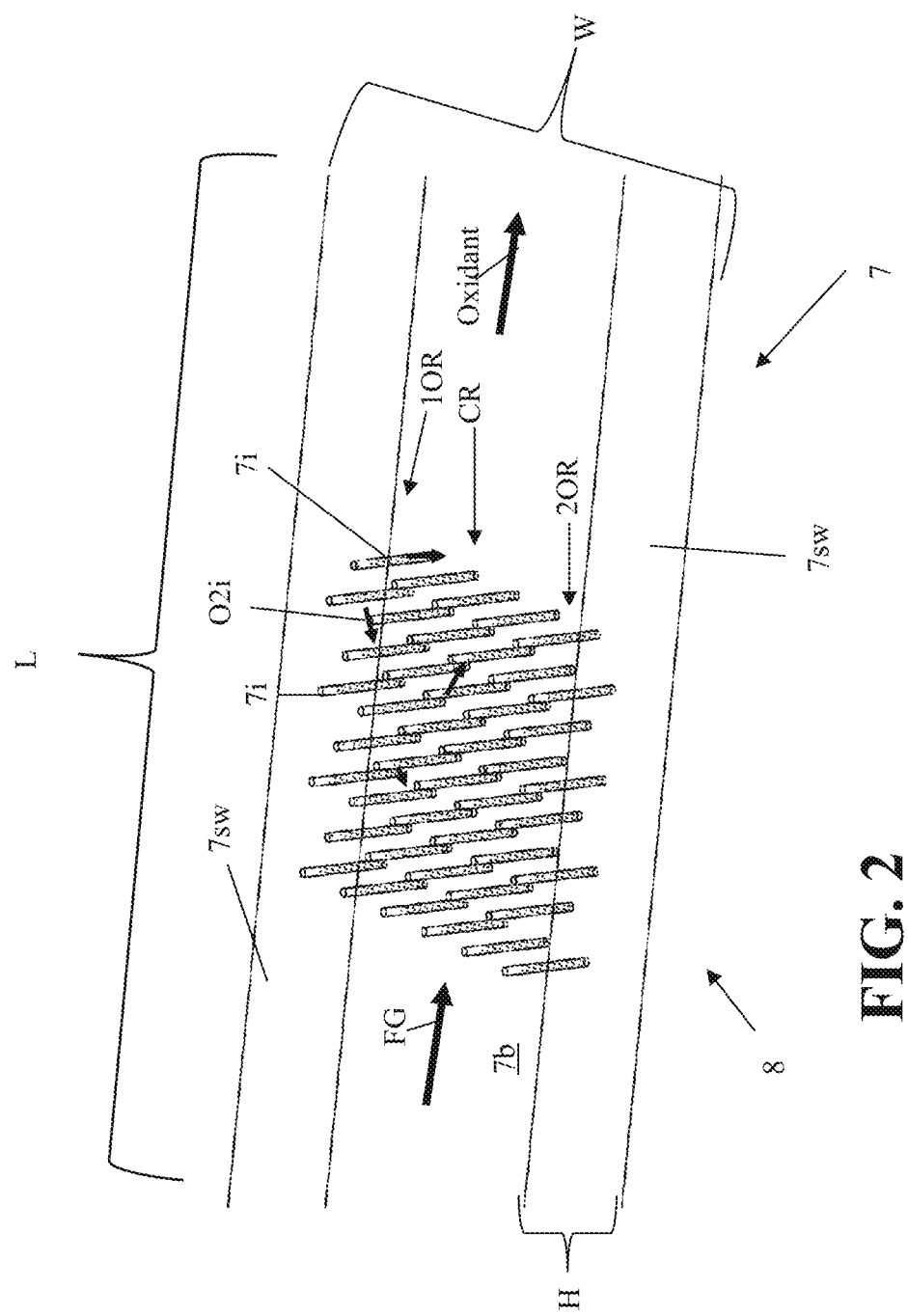
FIG. 2 is a schematic diagram of the first exemplary embodiment of the apparatus for oxidant formation with a top wall of the conduit of the apparatus removed to help illustrate positioning of injection devices $7i$ (e.g. diffusers, etc.) positionable within the conduit of the apparatus for injection of oxygen gas within the conduit for mixing with a carrier gas.
Figure 3:
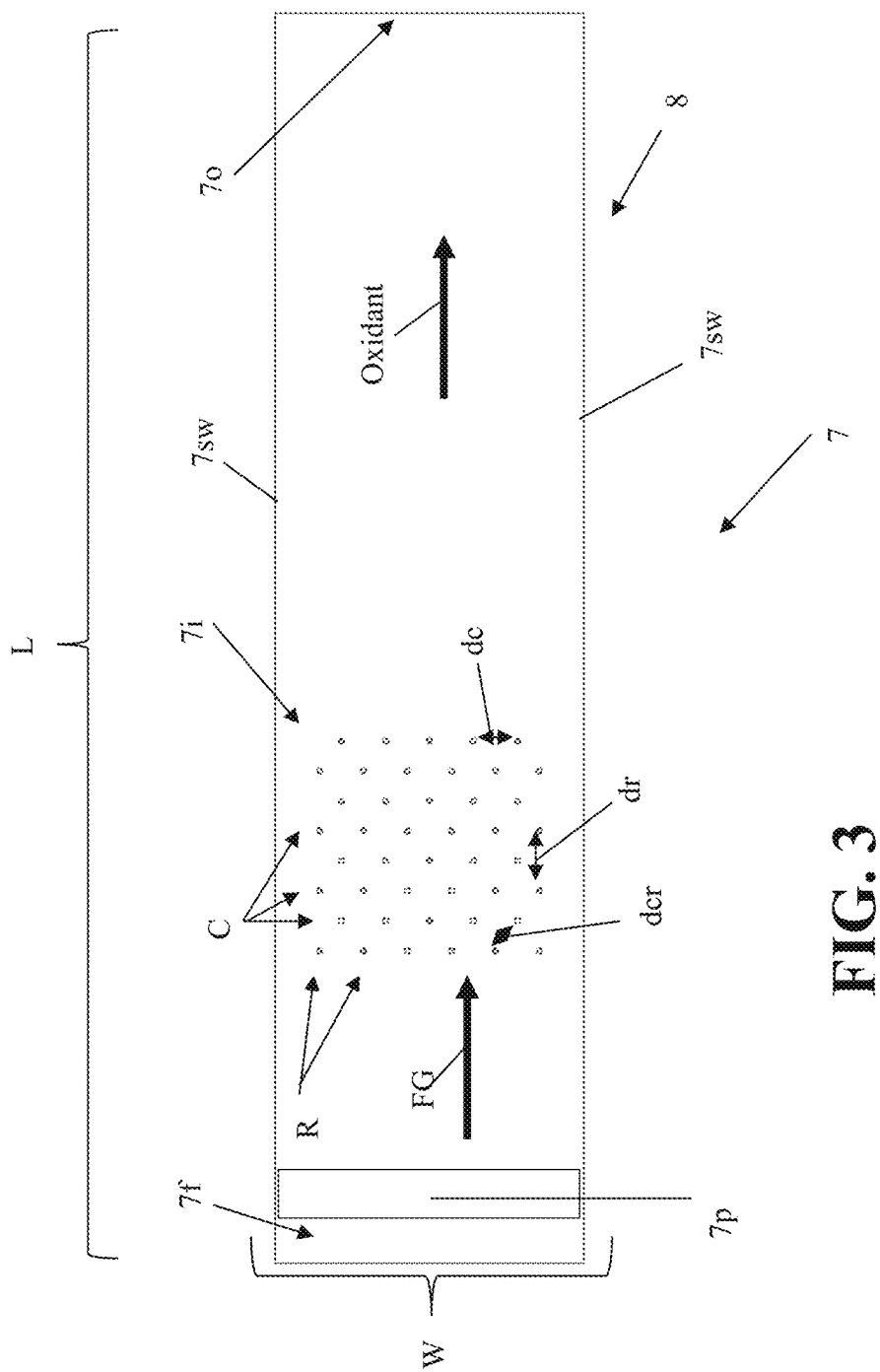
FIG. 3 is a schematic block diagram of the first exemplary embodiment of the apparatus for oxidant formation.

Referring to FIGS. 1-3, a combustion apparatus 1 can include a combustion device 3 that can have one or more burners 3b and can also include an apparatus 2 for oxidant formation for feeding the formed oxidant to the combustion device 3. Each of the burners 3b can emit fuel into a combustion chamber for combustion within the combustion device 3. The fuel can include a hydrocarbon fuel (e.g. pulverized coal, oil, natural gas, etc.) and/or other fuel (e.g. hydrogen) that can be provided by a pipeline, an industrial process element, a fuel storage unit, and/or other source of fuel. The burners and/or other inlets can also feed an oxidant formed via an apparatus 2 for oxidant formation into the combustion device for the combustion of the fuel.

For example, each burner 3b or at least one of the burners 3b can also receive a flow of oxidant (Oxidant) for feeding into the combustion chamber with the fuel. Alternatively (or in addition) at least one oxidant flow can be fed into the combustion chamber upstream or downstream of the one or more burners 3b to facilitate combustion of the fuel therein. Combustion of the fuel can generate heat and form a flue gas the includes combustion products of the combusted fuel. The combustion products included in the flue gas can include water, carbon dioxide and small amounts of carbon monoxide. The flue gas can also include nitrogen oxides (NOx).

In some embodiments, the combustion device 3 can be configured to heat a feed that may be fed to the combustion device 3. The feed can be, for example, water for generation of steam. As another example, the feed can be a material to be heated via the combustion for generation of a reaction to form one or more desired products. In yet other embodiments, the combustion device 3 can be a boiler for forming steam or a furnace that is configured to provide heat for melting glass, metal, or other material. Embodiments of the combustion device 3 can be configured to facilitate generation of power, generation of electricity, facilitate a steam/ hydrocarbon reforming process, or be utilized in another process in which combustion is desired. For instance, the combustion device 3 can be or include a gas turbine, a furnace, a boiler, or a steam reformer (e.g. a steam-methane reformer). The combustion device 3 can also be other types of combustors or devices used in combustion based processes that use an oxidant to combust a fuel.

Each burner 3b of the combustion device 3 can be any type of suitable burner or arrangement of burners. Some embodiments of the combustion device 3 can have a single burner. Other embodiments can utilize a plurality of burners. Each burner 3b can include a nozzle arrangement for feeding fuel or a mixture of fuel and an oxidant into the combustion chamber for combustion therein. Different types of burners 3b can be utilized. For instance, staged non-premixed oxidant burners can be used or an oxidant pre-mixed burner can be used.

At least one flow of oxidant can be provided to the combustion device 3 to facilitate combustion of a fuel and/or a feed therein. The oxidant can be a flow of oxygen enriched air or synthetic air. In embodiments that utilize oxygen enriched air, air can be a source of gas 4 (GS) that can be fed to a mixing device as a feed of carrier gas FG. Oxygen from a source of oxygen 5 can be fed to the mixing device 7 for injection into the carrier gas FG for formation of the oxidant, which can be an oxygen enriched air. The oxygen enriched air can be between 22 mole percent (mol %) oxygen and 35 mol % oxygen in some embodiments. Nitrogen can make up the substantial remaining portion of the oxidant in such an embodiment (e.g. be between 78 mol % nitrogen ($N_2$) and 70 mol % nitrogen). There can also be trace amounts of carbon dioxide (CO2), carbon monoxide (CO), water (H2O), and argon (Ar) as well as other trace elements (e.g. helium) in such an oxygen enriched oxidant that can be formed from a feed of air as the carrier gas FG having oxygen injected into it for mixing therein for forming the oxidant.

In other embodiments, an oxygen enriched air can be provided in which the carrier gas includes air from a source of gas 4 (GS) and recycled flue gas RFG that is mixed with the air to form the carrier gas FG prior to feeding the carrier gas to the mixing device 7. In such embodiments, the oxygen enriched air can include significantly higher concentrations of CO2 and water as compared to an oxygen enriched air that is formed by injection of oxygen into a carrier gas that only has air.

In yet other embodiments, the oxidant that is formed can be a synthetic air so that the use of ambient air or oxygen enriched air can be avoided or minimized. For example, while initial combustion of a fuel within a combustion chamber of the combustion device 3 during an initial start-up may be provided via oxygen enriched air, after initial start-up has progressed, the oxidant used for combustion can be changed, or switched, to synthetic air so that the use of air or oxygen enriched air can be stopped and no longer used for providing an oxidant for combustion. Instead, after the switchover to synthetic air, only a formed synthetic air can be provided as the oxidant to the combustion device 3 for combustion of the fuel.

In other embodiments, even the start-up of the combustion device 3 may be provided by use of the synthetic air such that no use of air or oxygen enriched air is utilized. For example, a source of gas 4 (GS) used for formation of the synthetic air can be a source of CO2 (e.g. a CO2 pipeline, a CO2 storage tank storing CO2, etc.), and/or another plant process that provides flue gas for mixing with oxygen to form the oxidant and the flue gas may be sufficiently present at the start-up of the combustion device 3 (e.g. via storage in a storage tank and/or via being provided by this process element) that there is no need for any air or oxygen enriched air to be utilized.

The oxidant that is formed as synthetic air can be formed via a mixing device 7 of the apparatus 2 for oxidant formation. The mixing device 7 can receive a carrier gas FG from at least one source of flue gas and/or a recycle stream of flue gas that can be recycled from flue gas formed from combustion in the combustion device 3 that can be emitted from the combustion device 3 via a flue gas conduit 3e. For instance, the source of gas 4 can include flue gas from an industrial plant element or an industrial plant process unit that can generate a flue gas via combustion or other process and be connected to the mixing device 7 for feeding that flue gas to the mixing device 7. The flue gas can also, or alternatively, include flue gas formed in the combustion device 3 that is subsequently fed to the mixing device 7 as recycled flue gas RFG via a flue gas recycle conduit 3r connected between the mixing device 7 and the flue gas outlet conduit 3e of the combustion device 3.

The exact composition of the flue gas can be different based on the type of industrial process that is utilized to generate the flue gas and/or the type of fuel being combusted to form the flue gas. In many embodiments, the flue gas can include carbon dioxide and water, as well as other constituents (e.g. carbon monoxide, argon, nitrogen, etc.). The carbon dioxide can be a significant portion of the flue gas (e.g. between 40 mole percent (mol %) and 70 mol % of the flue gas). The flue gas can also have between 5 mol % and 60 mol % water and between 0 mol % nitrogen to 30 mol % nitrogen.

The flue gas can also include argon, helium, carbon monoxide, or other constituents. For instance, the flue gas can have between 0 mol % argon and 5 mol % argon, between 0 mol % carbon monoxide and 0.5 mol % carbon monoxide, and between 0 mol % helium and 1 mol % helium.

The mixing device 7 can also receive oxygen ($O_2$) gas from at least one source of oxygen 5 (O2) for mixing with the flue gas to form synthetic air as the oxidant to be fed to the combustion device 3. The oxygen can be 100 mol % oxygen, or can be between 100 mol % oxygen and 98 mol % oxygen, or can be between 85 mol % oxygen and 100 mol % oxygen. In other embodiments, the oxygen of the source of oxygen 5 can have another suitable oxygen concentration as well.

The source of oxygen 5 can include, for example, liquid oxygen stored in a cryogenic oxygen storage tank that can be vaporized and subsequently fed to a buffer tank for feeding to the mixing device 7, oxygen gas stored in an oxygen storage tank, oxygen output from an air separation unit (ASU), oxygen formed from a vacuum swing adsorption (VSA) process, or other suitable source of oxygen gas.

The formed synthetic air used as the oxidant can have a significant amount of carbon dioxide (CO2) as well as between 20 mol % O2 and 30 mol % O2. For example, the CO2 content of the formed synthetic air can be between 30 mol % and 80 mol % or between 30 mol % and 60 mol %. Water (H2O) can also be included in the formed synthetic air to help inhibit NOx formation from combustion within the combustion chamber of the combustion device 3. The water can be between 2 mol % and 40 mol % of the synthetic air in some embodiments. In other embodiments, water may not be present or may only be present in a relatively trace amount (e.g. water can be between 0 mol % and 5 mol % of the synthetic air).

In some embodiments, the synthetic air can be formed so that there is a pre-selected ratio of water to CO2 (water/CO2). This pre-selected ratio can be 0.8, between 0 and 1.1, or between 0.7 and 0.9 in some embodiments. Other embodiments can also utilize another suitable ratio that may be configured to meet a particular set of design criteria.

The water included in the synthetic air can include water in the flue gas. In some embodiments, the water can also be provided by injecting water from a source of water into the flue gas via the mixing device 7 or a water injection mechanism positioned upstream of the mixing device 7.

The formed synthetic air can have a low amount of nitrogen therein that is much lower than the nitrogen content in air or oxygen enriched air. For example, the formed synthetic air can include between 20 mol % oxygen (O2) and 40 mol % O2, between 0 mol % argon (Ar) and 2 mol % Ar, between 2 mol % nitrogen (N2) and 20 mol % N2, between 5 mol % water and 40 mol % water, and between 30 mol % carbon dioxide (CO2) and 60 mol % CO2. The formed synthetic air can also include other constituents such as small or trace amounts of carbon monoxide (CO) and helium (He), for example.

For instance, the mixing device 7 can be configured for use of the oxygen and flue gas for formation of synthetic air that can include 30 mol % to 60 mol % CO2, 23 mol % to 28 mol % O2, 1 mol % Ar to 2 mol % Ar, 5 mol % N2 to 15 mol % N2, and 5 mol % water to 40 mol % water. As another example, the mixing device 7 can be configured for use of the oxygen and flue gas for formation of synthetic air that can include 30 mol % to 70 mol % CO2, 20 mol % to 35 mol % O2, 1 mol % Ar to 2 mol % Ar, 5 mol % N2 to 20 mol % N2, and 2 mol % water to 40 mol % water.

As yet another example, the mixing device 7 can be configured for formation of synthetic air that can include less than 15 mol % N2 or less than 10 mol % N2. Preferably, the N2 concentration in the formed synthetic air is minimized or otherwise kept relatively low (e.g. below 20 mol % or below 15 mol %). However, N2 may ingress into a combustion chamber due to imperfect seals and/or exposure of the combustion chamber to atmospheric air that may occur due to other non-perfect sealed conditions over time. This can be a particular issue in the event the flue gas FG used for formation of the synthetic air is flue gas that is formed from the combustion in the combustion chamber and recycled as recycled flue gas RF for providing as the source of the flue gas FG for the synthetic air formation. In such a situation, while the N2 concentration for the formed synthetic air can initially be about 0 mol % or between 10 mol % and 0 mol % or between 5 mol % and 0 mol %, the N2 concentration within the synthetic air may increase over time to a higher concentration (e.g. between 5 mol % and 15 mol % or between 5 mol % and 20 mol %).

In other situations (e.g. a newer combustion device facility), seals and other potential sites of ambient air ingress may not be a significant issue. In such a situation, the formed synthetic air can be maintained so that the N2 concentration of the synthetic air is under 20 mol %, preferably under 12 mol %, and most preferably between 10 mol % and 0 mol %. In some embodiments, it is contemplated that the synthetic air that is formed can have 0 mol % N2 or only a trace amount of N2 (e.g. between 0 mol % N2 and 1 mol % N2).

We have found that the use of synthetic air as the oxidant in the combustion chamber of the combustion device 3 can facilitate low NOx formation during combustion of a fuel. Use of the synthetic air having low N2 concentrations can help avoid the presence of nitrogen for formation of NOx. Further, the synthetic air can include relatively high concentrations of CO2 and water, which can help further inhibit NOx formation. We surprisingly found that embodiments of the combustion apparatus 1 that utilize synthetic air having such low N2 concentrations and relatively high water and CO2 concentrations can provide a substantial reduction of NOx formation (e.g. provide between a 75% and 95% reduction in NOx formation as compared to use of air as the oxidant or oxygen enriched air as the oxidant (e.g. oxidant flows having between 70 mol % N2 and 79 mol % N2 and between 20 mol % O2 and 28 mol % O2) in some embodiments).

The synthetic air can be fed to the combustion device 3 after being formed via oxygen injection into flue gas via the mixing device 7 in different ways. For example, the synthetic air can be fed into the combustion device via annular conduits of at least one burner 3b that is fluidly connected to the mixing device 7 via a burner feed conduit between the mixing device 7 and the burner 3b. As another example, the synthetic air can be fed to the combustion device 3 via one or more combustion chamber inlets that are fluidly connected to the mixing device 7 via at least one oxidant feed conduit 6 (shown in broken line) connected between the mixing device 7 and the combustion device 3.

We have also found that the utilization of synthetic air having a high concentration of $CO_2$ can be beneficial for use in carbon capture to avoid $CO_2$ emissions and/or form at least one $CO_2$ product stream from operations of the combustion device 3. For example, flue gas output from the combustion device 3 via flue gas output conduit 3e can be fed to a carbon capture apparatus 11 for processing of the flue gas to form at least one $CO_2$ product stream 11p. In some embodiments, a first portion of the output flue gas can be fed to the carbon capture apparatus 11 and a second portion of the output flue gas can be fed to the mixing device 7 as a source of gas via a flue gas recycle conduit 3r connected between the mixing device 7 and the flue gas output conduit 3e of the combustion device 3. The first portion of the flue gas fed to the carbon capture apparatus 11 can be between 30% and 70% of the flue gas output from the combustion device and the second portion of the flue gas recycled back to the mixing device 7 can be the balance of the flue gas (e.g. between 70% and 30% of the flue gas output from the combustion device 3). For example, during operation, the proportion of output flue gas recycled back to the mixing device 7 can vary from a substantial portion (e.g. close to 70% of it) to a minimal portion (e.g. 30% of it or 35%, etc.) and the portion of the output flue gas fed to the carbon capture apparatus 11 can correspondingly vary as well (e.g. be close to 30% of the output flue gas when a substantial portion is recycled and be close to or at 70% of the output flue gas when the minimal portion of the flue gas is recycled back to the mixing device 7).

For instance, when the $CO_2$ content of the synthetic air is high, the proportion of the flue gas fed to the carbon capture apparatus 11 may be higher (e.g. between 50% to 70% of the output flue gas) to facilitate a more efficient capturing of carbon dioxide from the flue gas. Conversely, when the flue gas concentration may have a lower content of $CO_2$, the proportion of the flue gas fed to the carbon capture apparatus 11 can be lower (e.g. closer to 30% of the output flue gas).

The proportional split of the flue gas formed from combustion in the combustion device that is passed through the flue gas output conduit 3e for carbon capture and recycling of flue gas to the mixing device 7 can be adapted to other proportions as well. For example, the portions can be 50% each or the first portion fed to the carbon capture apparatus 11 can be between 40% and 60% of the flue gas output from the combustion device 3 via flue gas output conduit 3e and the remaining portion of the flue gas can be recycled back to the mixing device 7 as the recycled flue gas RFG. In yet other embodiments, some of the flue gas can be routed differently (e.g. another portion of flue gas can be provided for venting of flue gas or a first portion of the flue gas can be vented instead of being fed to the carbon capture apparatus 11 and the second portion can be recycled back to the mixing device 7).

We have found that obtaining a high content of $CO_2$ within the flue gas formed from combustion with the combustion device 3 can permit the $CO_2$ to be separated from the flue gas more efficiently and allow a greater recovery of the $CO_2$. For example, some embodiments can facilitate a capturing and recovery of 95% or more than 95% of the $CO_2$ within the flue gas formed from the combustion within the combustion chamber of the combustion device 3. Also, the concentration of $CO_2$ within the formed $CO_2$ product stream(s) 11p outputtable from the carbon capture apparatus 11 can be high (e.g. 95 mol % $CO_2$, between 95 mol % $CO_2$ and 100 mol % $CO_2$, greater than or equal to 90 mol % $CO_2$ and less than 100 mol % $CO_2$, etc.).

As may best be appreciated from FIGS. 2 and 3, embodiments of the apparatus 2 for oxidant formation can include a mixing device 7 that can be configured to form the oxidant as an oxygen enriched air or synthetic air (examples of oxidants that can be formed via the mixing device 7 are discussed herein). Oxygen from a source of oxygen 5 can be fed to a plurality of injection devices 7i positioned in a conduit 8 of the mixing device 7. The conduit 8 of the mixing device 7 can be a rectangular duct having a duct aspect ratio of between 1.5 and 5 or between 2 and 4 in some embodiments. Other embodiments may utilize a different aspect ratio (e.g. a ratio of greater than 5, etc.). The conduit 8 of the mixing device 7 can also receive the carrier gas FG for formation of the oxidant via oxygen injection into the carrier gas FG via a carrier gas inlet 7f of the conduit 8 of the mixing device 7. The carrier gas inlet 7f can be at an end of the conduit 8 of the mixing device 7 that is opposite the outlet 70 of the conduit 8 of the mixing device 7.

The injection devices 7i can be diffusers or other types of injectors, for example. Each injection device 7i can have a plurality of oxygen injection apertures along a periphery or circumference of the body of the injection device 7i. The body of the injection device 7i can be a tube (e.g. cylindrical shaped tube with perimeter apertures for oxygen injection, polygonal shaped tube with perimeter apertures for oxygen injection, etc.). The body of each injection device 7i can be positioned so its length extends along the height H of the conduit and the diameter of the injection device body extends along a width W and/or length L of the conduit perpendicular to the height H of the conduit. The injection devices 7i can have an inlet in fluid connection with the source of oxygen 5 for receiving the oxygen for passing the oxygen out of the apertures of the injection devices 7i as jets of oxygen O2i within the conduit 8 of the mixing device 7 for mixing with the carrier gas passed along the injection devices 7i.

The injection devices 7i can be positioned and configured to inject the oxygen into the carrier gas passing along the injection devices 7i at a pre-selected injection pressure. The pre-selected injection pressure can be a suitable pressure within a pre-selected oxygen injection pressure range that can meet a pre-selected set of design criteria. In some embodiments, the pre-selected oxygen injection pressure range can be between 137 kPa and 276 kPa or between 150 kPa and 240 kPa (e.g. 207 kPa, between 205 kPa and 215 kPa, etc.).

The oxygen injection apertures defined in each of the injection devices 7i can be spaced apart from each other vertically and form multiple different spaced apart rows of apertures at different locations along a height of the body of the injection device 7i that can be positioned in the conduit 8 of the mixing device 7 and extend along a height H of the conduit. Oxygen from the source of oxygen 5 can be injected as jets of oxygen O2i that can be passed out of the apertures of the injection devices 7i for being injected into a carrier gas FG passed through the conduit 8 of the mixing device 7 along a length L of the conduit so that the carrier gas passes along the injection devices 7i to receive the jets of oxygen O2i for mixing the oxygen within the carrier gas FG to form the oxidant. The oxidant can be formed downstream of the injection devices 7i and before the oxidant is output from the outlet 70 of the conduit 8 of the mixing device 7.

The injection devices 7*i* can be positioned in a staggered arrangement. An example of a staggered arrangement may best be seen from FIGS. 2 and 3. For instance, the injection devices 7*i* can be arranged in the conduit in a series of rows R of spaced apart injection devices 7*i* and a series of columns C of spaced apart injection devices 7*i*. The rows R can extend along a portion of the length L of the conduit 8 of the mixing device 7. The columns C can extend along the width W of the conduit 8 of the mixing device 7.

Each injection device 7*i* can be within a respective column C of the injection devices and be spaced apart by a column distance dc from an immediately adjacent injection device of that column C. Each injection device 7*i* can also be in a respective row of the rows R of injection devices 7*i*. Each injection device 7*i* can be spaced apart from immediately adjacent injection devices 7*i* of their row R by a row distance dr. The row distance dr and the column distance dc can be selected to meet a pre-selected set of design criteria to facilitate mixing of the jets of oxygen O2*i* with the carrier gas so that the oxidant is formed prior to being output from the outlet 70 of the conduit 7.

The staggered injection devices 7*i* can also be spaced apart from other immediately adjacent injection devices in adjacent columns or adjacent rows by a column and row distance dcr. The staggering of rows and columns can be selected so that the column and row distance der is a distance between an injection device 7*i* of a particular row R and column C (e.g. a first row and a first column) and another immediately adjacent injection device 7*i* of another row R and another column C (e.g. a second row and a second column). The spacing of the row distance dr, column distance dc, and column and row distance der can be selected to define a pre-selected staggered pattern to meet a pre-selected set of design criteria for mixing of the oxygen injected into the carrier gas FG for forming the oxidant before the oxidant is output from the outlet 70 of the conduit 8 of the mixing device 7.

The columns C of injection devices 7*i* can be arranged so a first injection device 7*i* of each column is positioned adjacent to a first sidewall 7*sw* of the conduit 8 of the mixing device 7 and is a first terminal end injection device of the column C of injection devices 7*i*. A second injection device 7*i* of each column can be positioned adjacent to a second sidewall 7*sw* of the conduit 8 of the mixing device 7 and can be a second terminal end injection device of the column C of injection devices 7*i*. There can be a plurality of other injection devices for each column that is between the first injection device and second injection device of the column. Some of these third injection devices 7*i* can define a central region of the injection devices 7*i*.

A first outer region 1OR of the injection devices 7*i* can include the injection devices 7*i* closest to the first sidewall 7*sw* and a second outer region 2OR of the injection devices 7*i* can include the injection devices closest to the second sidewall 7*sw*. The central region CR of the injection devices can be positioned between the first outer region 1OR of injection devices 7*i* and second outer region 2OR of injection devices 7*i*.

For example, the central region CR can include one or more rows R of the injection devices 7*i* that are located between at least a first outer row R of injection devices 7*i* positioned adjacent to the first sidewall 7*sw* and at least a second outer row R of injection devices 7*i* positioned adjacent to the second sidewall 7*sw*. In some embodiments, each outer region can include only a single row, at least two outer rows, or at least three outer rows. In such embodiments, the central region CR can include at least two rows R of injection devices 7*i* or at least three rows of injection devices 7*i*.

In some embodiments, the mixing device 7 can be arranged and configured so that the flow rates of oxygen injected via the injection devices 7*i* differs from the central region CR injection device and the outer region injection devices of the first and second outer regions 1OR and 2OR. For instance, in some configurations or implementations, the central region of injection devices can inject 50%-60% of the overall mass of oxygen being injected and the outer region injection devices 7*i* for each outer region can inject 25% to 20% of the overall mass of oxygen being injected. In other embodiments, the central region CR injection devices 7*i* can inject between 40% to 55% of the overall mass of oxygen into the carrier gas FG and the each of the outer region injection devices 7*i* can inject between 30% and 22.5% of the overall mass of oxygen into the carrier gas FG. In some embodiments, the outer region injection devices of the first and second outer regions 1OR and 2OR can provide a net injection of oxygen into the conduit that is between 5% and 30% less than the oxygen injected via the injection devices 7*i* of the central region CR.

Also, the flow rates of oxygen injected by each of the injection devices of each outer region can differ from the flow rates of oxygen injected by each of the injection devices of the central region CR by at least 10% or at least 20% (e.g. an injection rate that is between 10% higher and 35% higher than the injection rate used for the injection devices of either outer region 1OR or 2OR, etc.). For instance, each of the injection devices 7*i* of the central region CR can inject oxygen at a mass flow rate that is at least 20% higher than the mass flow rate of each injection device 7*i* of the first outer region 1OR. Each of the injection devices 7*i* of the central region CR can inject oxygen at a mass flow rate that is also at least 20% higher than the mass flow rate of each injection device 7*i* of the second outer region 2OR as well.

As another example, each of the injection devices 7*i* of the central region CR can inject oxygen at a mass flow rate that is at least 10% higher (e.g. between 10% higher and 35% higher, more than 30% higher, more than 20% higher, etc.) than the mass flow rate of each injection device 7*i* of the first outer region 1OR. Each of the injection devices 7*i* of the central region CR can inject oxygen at a mass flow rate that is also at least 10% higher (e.g. between 10% higher and 35% higher, etc.) than the mass flow rate of each injection device 7*i* of the second outer region 2OR as well.

In some other embodiments, each of the injection devices 7*i* of the central region CR can inject oxygen at a mass flow rate that is at least 5% higher (e.g. between 5% higher and 35% higher, more than 10% higher, more than 20% higher, etc.) than the mass flow rate of each injection device 7*i* of the first outer region 1OR. Each of the injection devices 7*i* of the central region CR can inject oxygen at a mass flow rate that is also at least 5% higher (e.g. between 5% higher and 35% higher, etc.) than the mass flow rate of each injection device 7*i* of the second outer region 2OR as well.

In some implementations each injection device of the first outer region 1OR and second outer region 2OR can inject oxygen at an outer region flow rate and each injection device of the central region CR can inject oxygen at a central region flow rate. The central region flow rate used via the central region injection devices can be at least 20% higher than the outer region flow rate used by the injection devices of the first outer region 1OR and second outer region 2OR (e.g. be between 20% higher and 35% higher). In other embodiments, the central region flow rate used via the central region injection devices can be between 5% higher and 35% higher than the outer region flow rate used by the injection devices of the first outer region 1OR and second outer region 2OR. As yet another example, the central region flow rate used via the central region injection devices can be at least 10% higher than the outer region flow rate used by the injection devices of the first outer region 1OR and second outer region 2OR (e.g. be between 10% higher and 35% higher).

We have found that the having the flow rates of each injection device $7i$ of the central region CR being greater than the flow rates of oxygen injected via each of the injection devices of the first and second outer regions 1OR and 2OR can surprisingly provide improved mixing of fluid to provide a more desirable oxygen concentration profile within the formed oxidant that can help avoid higher peak oxygen concentrations adjacent duct walls to help avoid degradation that can occur from such walls being exposed to overly high oxygen concentrations (e.g. oxygen concentrations of over 40 mol % O2).

The injection devices $7i$ and the conduit 8 of the mixing device 7 can be arranged and configured so that a pre-selected pressure drop occurs as the carrier gas FG is passed through the conduit to mix with the injected jets of oxygen O2i and form the oxidant. This pre-selected pressure drop can be between 24 Pa and 250 Pa in some embodiments (e.g. can be 50 Pa or other value within the range of 24 Pa and 250 Pa). Other embodiments may utilize another suitable pressure drop to account for a different set of criteria.

The mixing device 7 can also include at least one flow conditioning device $7p$ that can be positioned upstream of the injection devices $7i$ to condition the carrier gas FG fed into the mixing device 7 for forming the oxidant. A flow conditioning device $7p$ can include, for example, a perforated plate, turning vanes, baffles, tube banks, and/or combinations of these flow conditioning elements, for example. In some embodiments, the flow conditioning device $7p$ can be positioned downstream of a carrier gas flow device that can help drive the flow of carrier gas through the mixing device 7 (e.g. fan, booster, blower, compressor, etc.) or positioned downstream of flow disturbance components (e.g. turns, branches, expansion/contractions, dampers, etc.) at a distance between a value that is equal to half of a height H of the conduit 8 of the mixing device 7 and a value that is double the height H of the conduit (e.g. the distance the flow conditioning device $7p$ can be positioned from the fan, blower, booster, compressor, or duct turn can be between 0.5 of the height H of the conduit and 2 times the height H of the conduit or between a distance that is equal to the height H of the conduit or 1.5 times the height H of the conduit, etc.).

Other embodiments can utilize other types of spacing. For instance, some embodiments can be configured so that the flow conditioning device $7p$ can be positioned downstream of a carrier gas flow device that can help drive the flow of carrier gas through the mixing device 7 (e.g. fan, booster, blower, compressor, etc.) or positioned downstream of flow disturbance components (e.g. turns, branches, expansion/contractions, dampers, etc.) at a distance between a value that is equal to half of a height H of the conduit 8 of the mixing device 7 and a value that is triple the height H of the conduit (e.g. the distance the flow conditioning device $7p$ can be positioned from the fan, blower, booster, compressor, or duct turn can be between 0.5 of the height H of the conduit and 3 times the height H of the conduit or between a distance that is equal to the height H of the conduit or 2.5 times the height H of the conduit, etc.).

The flow conditioning device $7p$ can be positioned and configured to provide a uniform velocity profile for the carrier gas FG (e.g. air, flue gas, or a combination of air and flue gas, as discussed above, etc.) in the cross-section of the conduit 8 of the mixing device 7. For example, when the conduit is a rectangular duct, the flow conditioning device $7p$ can be positioned and configured so that the carrier gas has a uniform velocity profile along a cross-section of the rectangular duct (e.g. along the width W and height H of the conduit).

In some embodiments, the flow conditioning device $7p$ can include a perforated plate that has a plurality of holes that extend through a thickness of the plate. Each of the holes can have a hole diameter, which can also be considered a hole width. The perforated plate can be positioned so a length of the plate extends along a width W of the conduit 8 of the mixing device. For instance, the length of the perforated plate can extend between the mixing device conduit's first sidewall $7sw$ and second sidewalls $7sw$ (e.g. have opposite ends in contact with or integrally attached to the opposite sidewalls $7sw$). The perforated plate can also have a height that extends along a height H of the conduit between a bottom $7b$ of the conduit and a top of the conduit. The bottom $7b$ of the conduit 8 of the mixing device 7 can extend along a length L of the conduit between the sidewalls $7sw$ and the top of the conduit can be opposite the bottom $7b$ and also extend along the length L of the conduit between the sidewalls $7sw$. The bottom of the perforated plate can extend along a bottom of the conduit between its sidewalls $7sw$ and be integrally attached to the bottom $7b$ of the conduit or in contact with the bottom $7b$ of the conduit. The top of the perforated plate can extend along a top of the conduit between its sidewalls $7sw$ and be integrally attached to the top of the conduit or in contact with the top of the conduit.

The perforated plate can have thickness that extends along a length L of the conduit so that it extends along a flow direction of the carrier gas FG. The perforated plate can have a thickness to hole diameter ratio of 0.8 and above (e.g. over 0.8, over 1.0, etc.). Preferably a ratio of the thickness of the plate to the hole diameter is at least 0.3 or higher than 0.3 so that the perforated plate can provide the uniform velocity profile for the carrier gas FG that is passed through the holes of the plate.

We have found that the mixing device 7 can significantly improve oxygen mixing in a conduit 8 of the mixing device 7. We have found this to be particularly true for situations where the conduit 8 of the mixing device is a rectangular shaped duct and the carrier gas FG is a low pressure flow of gas (e.g. at a pressure of less than 12.442 kPa or less than 13 kPa, between 13 kPa and 1.0 kPa, between 13 kPa and 1.2 kPa, etc.). We surprisingly found excellent mixing capabilities of the mixing device 7 can be provided for large aspect ratios of between 1.5 and greater than 5 and between 1.5 and 5 (e.g. between 2.0 and 4.5 or between 2.0 and 4.0, etc.). We found good mixing for formation of an oxidant to be provided even for relatively short conduits 8 of the mixing device 7 that had a length L of between 12 meters and 30.5 meters or a length L of between 15 meters and 21.5 meters. Moreover, evaluations we have conducted have found that a well-mixed oxidant can be formed within the conduit 8 of the mixing device 7 between 3 meters and 7 meters downstream of the injection devices $7i$, such that the length L of the conduit 8 can be configured to be even shorter than such short lengths L.

Such short length mixing device conduits that can have relatively large duct aspect ratios can permit the mixing device 7 to be retrofit into different systems that may have a pre-existing conduit arrangement without requiring extensive conduit replacement. This can help reduce cost and downtime associate with installation of the mixing device 7 and also help facilitate implementation of a mixing device 7 into a combustion process or combustion system. This can be particularly true for conduits 8 that are rectangular in shape.

Achieving good mixing of a low pressure carrier gas with a large amount of oxygen from the source of oxygen 5 in a relatively large conduit 8 of the mixing device 7 (e.g. a relatively large sized rectangular duct having a duct aspect ratio of between 1.5 and 5 or 2 and 4, etc.) can be helpful for permitting embodiments of the mixing device 7 to be employed in a number of different types of combustion apparatus 1 configurations (e.g. steam reformers, steam-methane reformers, boilers, furnaces, etc.). This can be particularly advantageous in situations where the mass flow of oxygen to be mixed into a carrier gas FG to form an oxidant is relatively high (e.g. is over 20% of the total flow of the oxidant to be formed, is between 20% and 30% of the total flow of the oxidant to be formed, is between 15% and 35% of the overall flow rate of oxidant to be formed, etc.). For example, in situations in which the oxygen to be injected is to form synthetic air as the oxidant utilizing flue gas as the carrier gas FG, the amount of oxygen needed to form the oxidant can be substantially higher than that for ambient air oxygen enrichment that may have the same desired oxygen concentration level because the air already has about 21 mol % oxygen and, in contrast, the flue gas may have 0-2 mol % oxygen or only a trace amount of oxygen prior to the injection of oxygen from the source of oxygen 5. In the synthetic air formation processing, the mass of oxygen needed to form an oxidant having between 20 mol % oxygen and 40 mol % oxygen, between 20 mol % oxygen and 35 mol % oxygen, or between 21 mol % oxygen and 28 mol % oxygen is substantially greater. This can result in the mixing device 7 needing to be able to effectively mix a substantial mass flow rate of oxygen into the flue gas over a short conduit length to provide a suitably mixed oxidant for combustion operations of a combustion device 3. It is also desired to provide good mixing within a short section of the mixing device conduit while keeping peak oxygen concentration at the conduit walls (e.g. bottom 7b, top, sidewalls 7sw) at low values or values below a pre-selected maximum oxygen content level as we have found this can help prevent damage or wear to the mixing device 7 and downstream conduits. We have found that embodiments of our mixing device 7 can surprisingly permit multiple major fluids with injected stream (e.g. oxygen injection) to carrier stream (e.g. air or flue gas) mass flow ratio in the range of 0.1 to 1.0. For example, we have found that embodiments of our mixing device 7 can facilitate mixing with flue gas or air mixed with flue gas carrier gas applications in which the oxygen to carrier gas mass ratio is high (e.g. at least 0.4, between 0.3 and 0.5, between 0.3 to 1.0, etc.).

Figure 4:
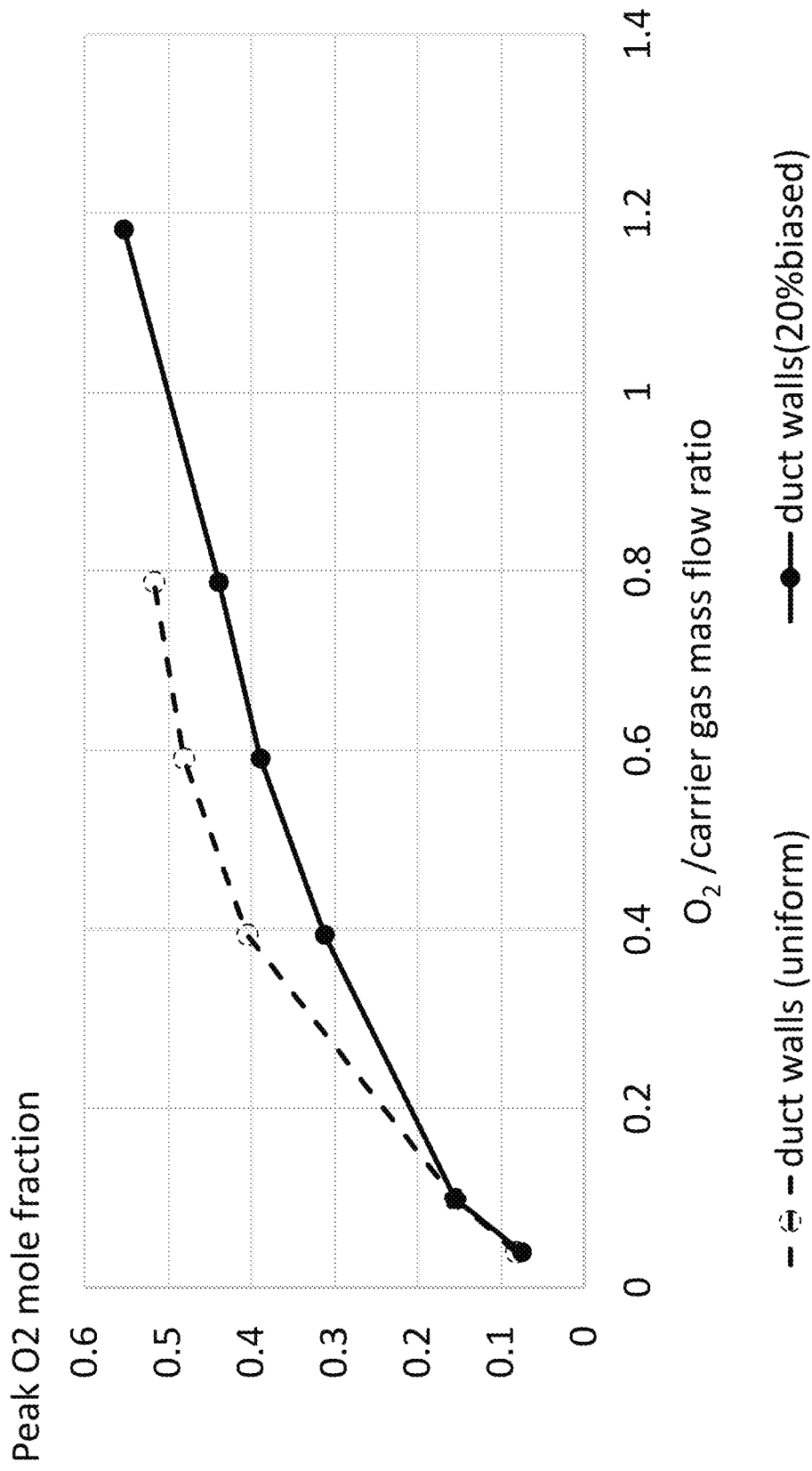
FIG. 4 is a graph illustrating Computational Fluid Dynamic (CFD) modeling results that illustrate peak oxygen concentrations ("Peak O2 mole fraction") at conduit surfaces for different oxygen/carrier gas mass flow ratios ("$O_2$/carrier gas mass flow ratio").
Figure 5:
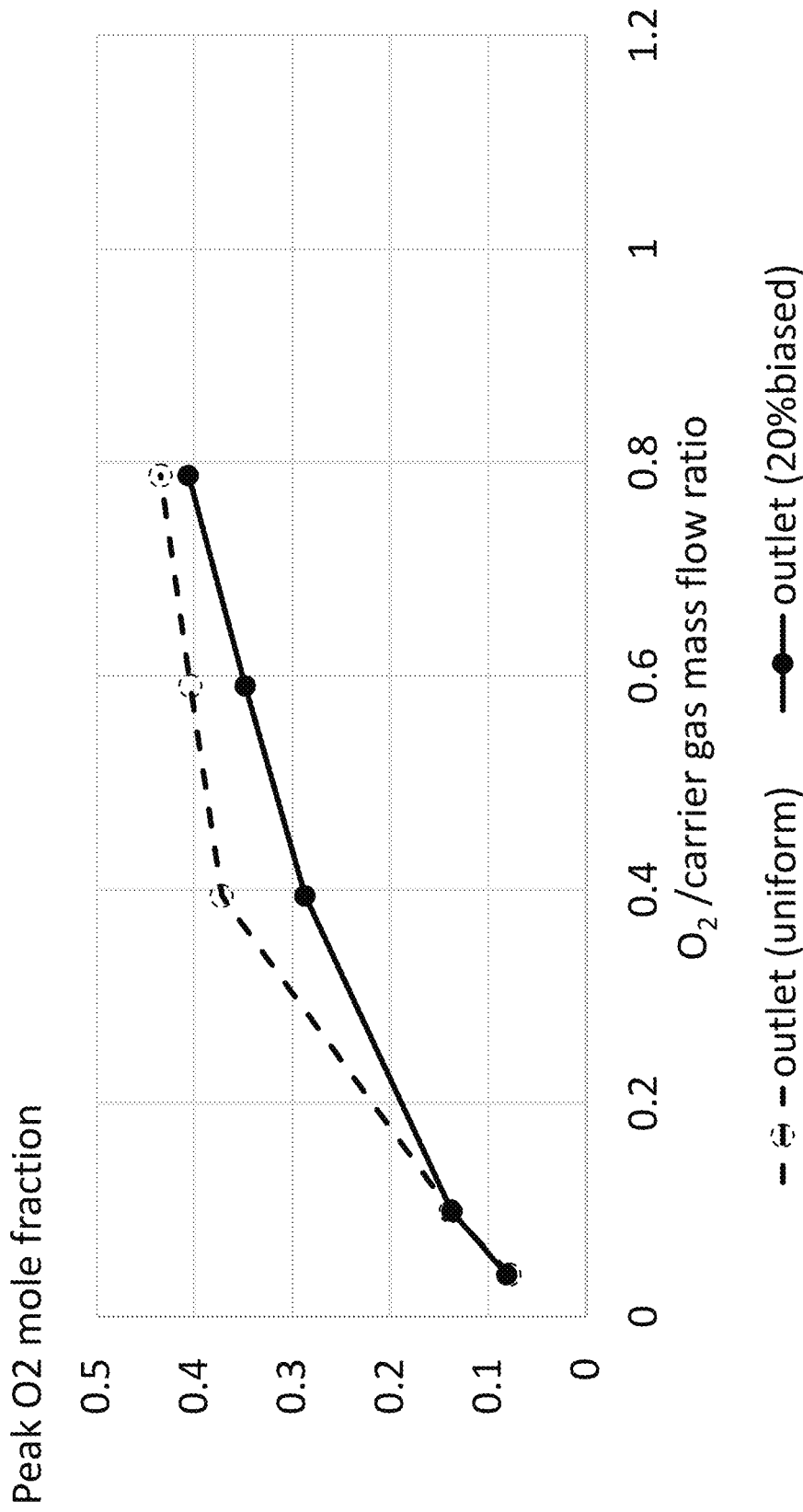
FIG. 5 is a graph illustrating CFD modeling results that illustrate bulk peak oxygen concentrations ("Peak O2 mole fraction at duct walls") at the outlet 70 of the apparatus for oxidant formation for different aspect ratios ("$O_2$/carrier gas mass flow ratio").

Computational flow analyses were performed for different embodiments of the apparatus for oxidant formation. FIGS. 4 and 5 illustrate results from the conducted evaluation in which the conduit 8 of the mixing device 7 was a rectangular duct having a width W, length L, and height H. As can be seen from FIGS. 4 and 5, utilization of uniform feeding of oxygen into the carrier gas via all the injection devices 7i providing the same rate of oxygen injection provide mixing that resulted in a peak oxygen concentration at the conduit walls (e.g. duct walls, which can include the top, bottom 7b and sidewalls 7sw) and at an outlet 70 of the mixing device 7. However, the utilization of a biased injection in which 20% more of the oxygen being injected was injected via the injection devices 7i of the central region CR as compared to the injection devices of the outer regions 1OR and 2OR (which utilized the same rates of oxygen injection) provided improved results by providing better mixing and lower peak oxygen fractions at the outlet 70 and at the conduit walls (e.g. bottom 7b, top, sidewalls 7sw).

Figure 6:
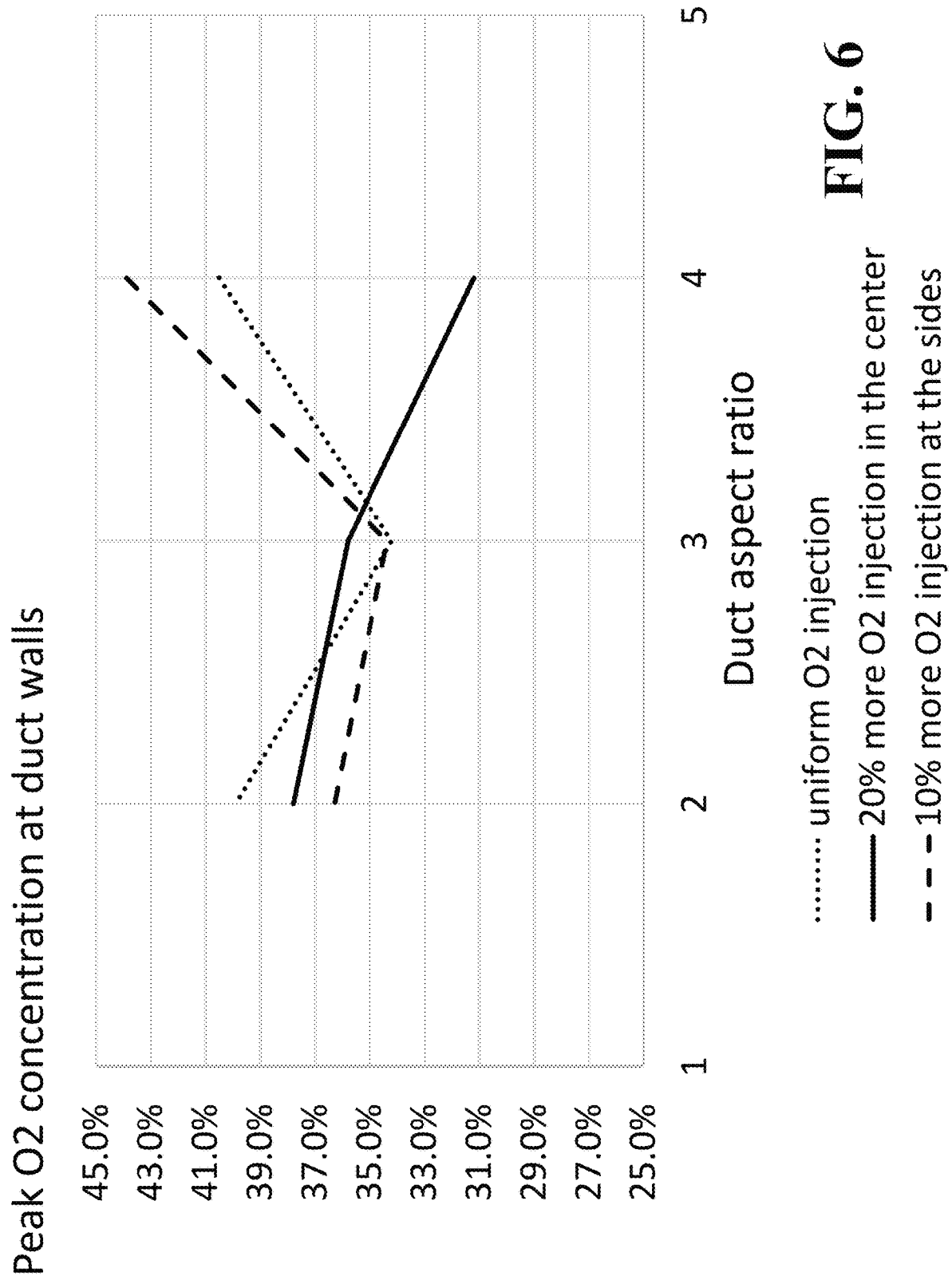
FIG. 6 is a graph illustrating CFD modeling results that illustrate peak oxygen concentrations ("Peak O2 mole fraction") at conduit surfaces for different duct aspect ratios ("Duct aspect ratio").
Figure 7:
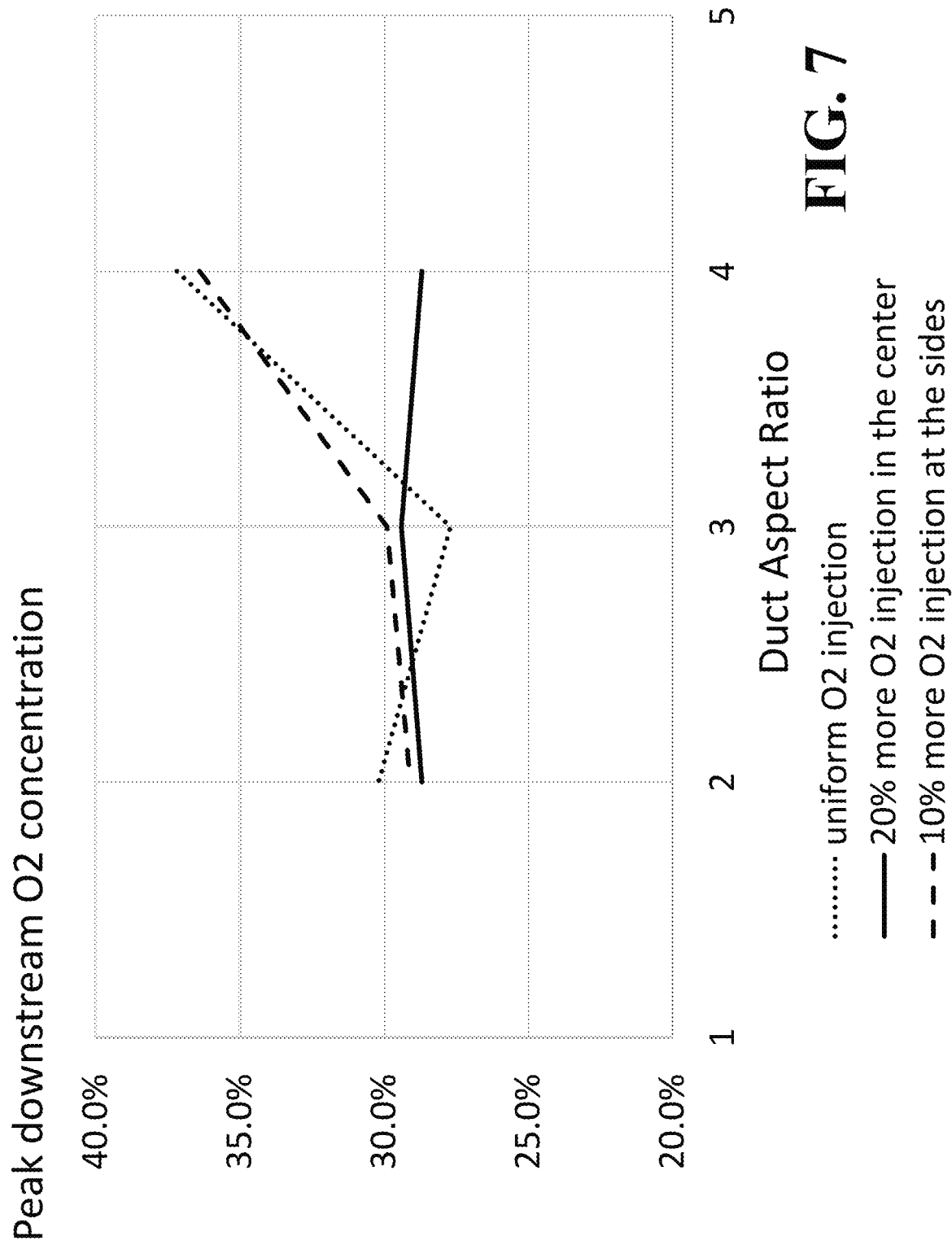
FIG. 7 is a graph illustrating CFD modeling results that illustrate bulk peak oxygen concentrations ("Peak downstream O2 concentration") at the outlet 70 of the apparatus for oxidant formation for different aspect ratios ("$O_2$/carrier gas mass flow ratio").

FIGS. 6 and 7 are additional graphs illustrating CFD results obtained from modeling of the embodiment of the mixing device 7 utilized for generating the data of FIGS. 4 and 5. FIGS. 6 and 7 also show that the utilization of a biased injection that provides higher oxygen injection at the central region CR as compared to the outer regions (1OR and 2OR) can provide superior mixing for relatively larger duct aspect ratios. For instance, FIG. 6 shows that this was found to be particularly true for large duct aspect ratios of 3 or more than 3 (e.g. 3-4, 3-4.5, 3-5, 3.5-5, etc.) in which each of the injection devices of the central region CR injected oxygen at a flow rate that was 20% higher as compared to the oxygen injection flow rates for the outer regions of injection devices. The CFD results show the utilization of a biased injection that provides higher oxygen injection at the central region CR as compared to the outer regions (1OR and 2OR) can provide a substantially better mixing result for duct aspect ratios of greater than 3.5, for example. Both the high duct aspect ratio and the biased injection that provides higher rates of oxygen injection at the central region CR as compared to the outer regions (1OR and 2OR) can be used to obtain these superior mixing results.

We also evaluated use of a central region injection rate for the injection devices of the central region CR that was an oxygen flow rate that was 10% higher than the oxygen flow rate set for the outer rejection injection rate for the for the injection devices of the outer regions (e.g. first outer region 1OR and second outer region 2OR) in situations where the duct aspect ratio was greater than 3. Our analysis found that a substantial improvement in peak O2 content reduction could be obtained by use of the 10% higher central region injection rate. As compared to uniform injection flow rates, use of the 10% higher central region injection rate for the injection devices of the central region CR was found to provide about a 7 mol % reduction in peak O2 content as compared to utilization of a uniform injection flow rate for all the regions (e.g. uniform flow rate peak O2 content was found to be about 40 mol % and peak O2 content was found to be about 33 mol % via the 10% higher central region injection rate). Based on the conducted evaluations, we believe a centrally biased oxygen injection in which the central region injection rate is 5% higher than the outer region injection rate used for the outer region injection devices (e.g. injection devices of the first and second outer regions 1OR and 2OR) may provide a significant improvement for duct aspect ratios that are greater than 3 as well (e.g. duct aspect ratios that are greater than 3 and up to 5, etc.).

Regardless, a clear and substantial improvement was obtainable by use of the centrally biased injection rates of greater than 10% and an even greater improvement was provided for such centrally biased injection rates that were 20% greater. This was found to be the case for situations in which a high duct aspect ratio is present (e.g. a duct aspect ratio of greater than 3 to 5 or 3.5 to 5, etc.), for example.

Figure 8:
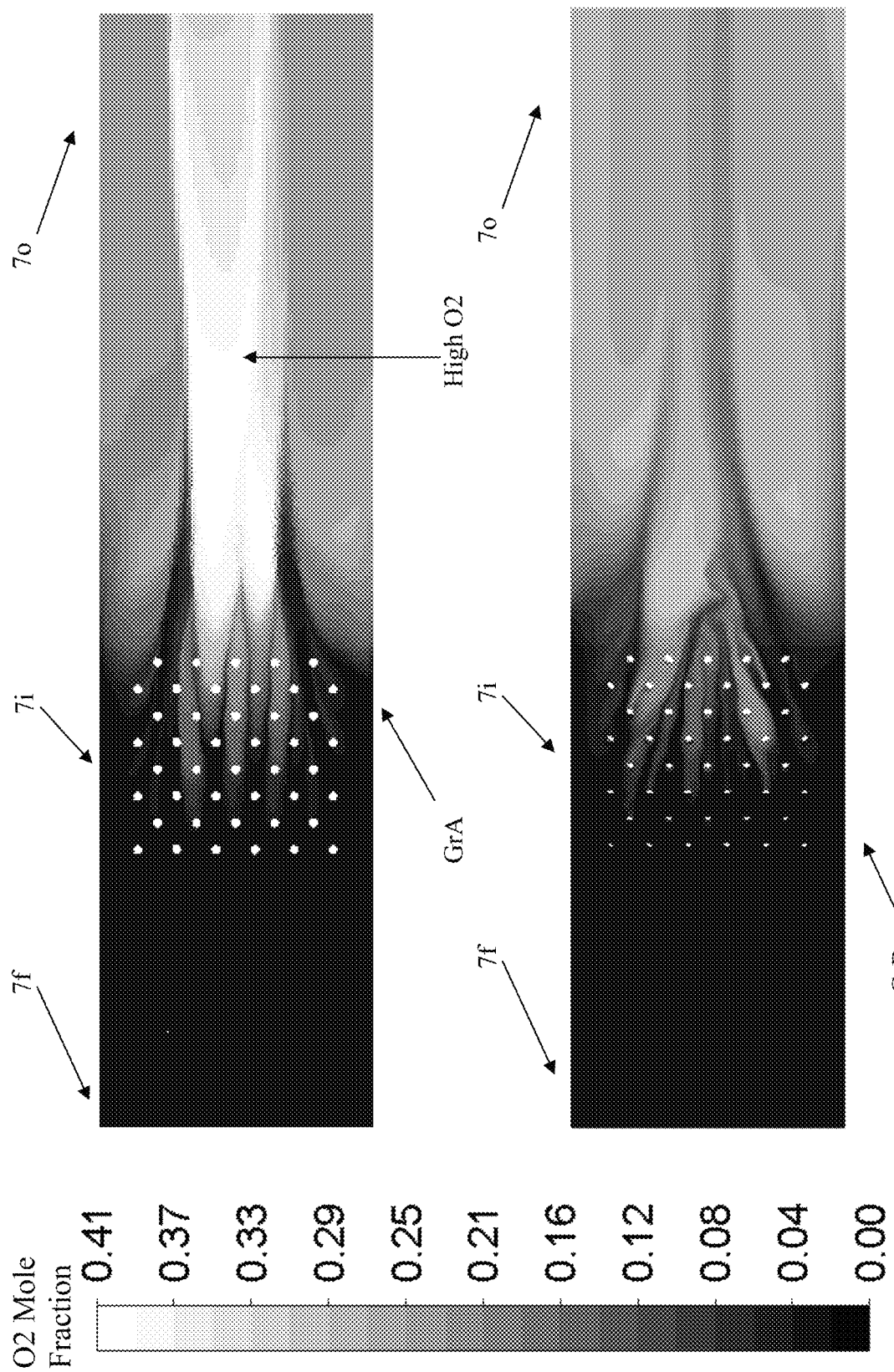
FIG. 8 is a series of oxygen concentration graphs illustrating oxygen concentration profile at the bottom wall of the conduit downstream of the location at which the oxygen is injected into a carrier gas to form the oxidant. A top graph GrA illustrates the mole fraction of oxygen ($O_2$ or $O_2$) within the first exemplary embodiment for oxidant formation in a condition in which the oxygen is injected at a same rate for all the injection devices $7i$. A bottom graph GrB illustrates the mole fraction of oxygen ($O_2$ or $O_2$) within the first exemplary embodiment for oxidant formation in a condition in which the oxygen is injected at a higher rate in a central region of the injection devices $7i$ and at a lower rate at the injection devices $7i$ adjacent the sidewalls $7sw$ (e.g. opposite sides of the central region, which can also be considered opposite outer regions of injection devices $7i$ that are positioned on opposite sides of the central region of injection devices 7i so each outer region is between the central region and a sidewall 7sw of a mixing device conduit).

The surprising results concerning the biased injection of oxygen of at least 20% more oxygen being injected into the carrier gas FG via injection devices 7i of the central region CR as compared to the outer regions positioned on opposite sides of the central region (e.g. first outer region 1OR and second outer region 2OR) was further corroborated by computation flow analyses performed as shown in FIG. 8. As can be seen from FIG. 8, a biased flow of oxygen injection at the bottom 7b of a 4:1 duct aspect conduit where the injection devices 7i of the central region CR oxygen injection mass flow rate is higher than the mass flow rate of oxygen injected via the side regions, or outer region injection devices 7i (e.g. injection devices of the first and second outer regions 1OR and 2OR) provided superior mixing as shown in the bottom graph of GrB as compared to use of a uniform flow rate of oxygen injection shown in the top graph GrA. As can be seen from FIG. 8, the peak value for oxygen concentration in the formed oxidant is lower and distribution is more uniform in the central region biases injection scenario shown in the bottom graph GrB as compared to the equal flow case of the top graph GrA. For instance, the High O2 region is only present in the top graph GrA, which helps highlight this distinction that was surprisingly found from the conducted CFD analyses.

These results of improved mixing provided via the biased injection of oxygen in the central region CR are surprising since having a greater injection within the central region CR could have resulted in having a higher O2 region in the center of the conduit 8. Instead, that is not the case and better mixing was surprisingly found to be obtainable by having the higher rate of injection in the central region CR.

Figure 9:
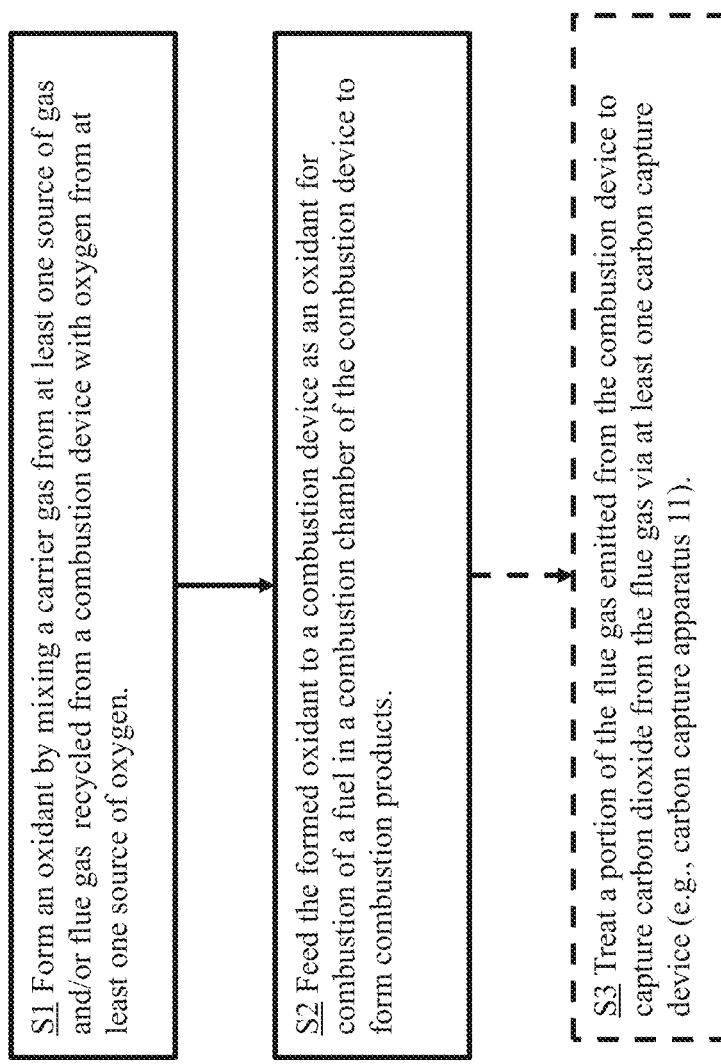
FIG. 9 is a flow chart illustrating a first exemplary embodiment of a process for oxidant formation, which can be utilized in an exemplary embodiment of a process for reduced nitrogen oxide formation during combustion. The first exemplary embodiment of the apparatus for reduced nitrogen oxide formation during combustion and/or the first exemplary embodiment of the apparatus for oxidant formation, can implement this first exemplary embodiment of the process shown in FIG. 9.

Embodiments of the combustion apparatus 1 can implement an embodiment of a process for oxidant formation or process for combustion that uses the formed oxidant. Examples of embodiments of such a process can be appreciated from FIG. 9. In a first step S1, an oxidant can be formed by mixing a carrier gas FG from at least one source of gas 4 and/or flue gas RGF recycled from a combustion device 3 with oxygen from at least one source of oxygen 5. The formed oxidant can be oxygen enriched air or synthetic air as discussed above, for example. The formed oxidant can be formed by mixing the carrier gas FG from at least one source of gas 4 and/or flue gas recycled from the combustion device 3 with oxygen from at least one source of oxygen via the mixing device 7, for example. Such formation can occur via a mixing device 7 injecting oxygen for mixing with the flue gas using a biased injection of oxygen in which at least 20% more oxygen is injected into a central region CR of injection devices 7i as compared to the outer regions of injection devices on opposite sides of the central region CR (e.g. between the central region and sidewalls 7sw of the conduit 8 of the mixing device). This injection can occur downstream of at least one flow conditioning device 7p (e.g. a perforated plate as discussed above, etc.) and form the oxidant prior to the oxidant being output from an outlet 7O of the mixing device 7.

In a second step S2, the formed oxidant can be fed to a combustion chamber of a combustion device 3 as an oxidant for combustion of a fuel in a combustion chamber of the combustion device to form combustion products. In situations where a synthetic air is utilized as the oxidant, use of the synthetic air as the oxidant can permit reduced nitrogen oxide formation to occur via the combustion as well (e.g., as discussed above and also discussed below)

Embodiments of the process can also include other steps. For example, some embodiments can include a third step S3 (shown in broken line), in which a portion of the formed flue gas that includes the combustion products formed from the combustion facilitated by the feed of formed oxidant can be emitted from the combustion device 3 for capturing carbon dioxide from that flue gas via at least one carbon capture device (e.g. carbon capture apparatus 11). This type of carbon capture can be provided at the same time some of the flue gas is also recycled back to a mixing device 7 as a flow of recycled flue gas RFG for forming the synthetic air as the oxidant as discussed above for embodiments in which synthetic air is formed as the oxidant. The proportions of flue gas fed to a carbon capture apparatus 11 and recycled to the mixing device 7 for formation of synthetic air or other oxidant can be adjusted to account for various operational conditions, which can include the content of CO2 within the flue gas as discussed above, for example. The proportional split can also include forming of other portions of flue gas for routing to other locations (e.g. forming of a third portion for venting, forming of another portion for feeding to another process device or industrial plant element, etc.).

As discussed above, it was surprisingly found that embodiments of the process and apparatus 1 can provide a substantial reduction in NOx formation. Also, embodiments can provide an improved ability to capture CO2 for providing of at least one product stream 11p of CO2 that can have a high CO2 concentration (e.g. greater than 90 mol % CO2, etc. as discussed above).

Confidential testing was performed to evaluate embodiments of our apparatus 1 and process for reduced nitrogen oxide formation during combustion. This testing showed that substantial NOx reductions and improved carbon capture can be provided by embodiments of our apparatus 1 and process.

In conducted testing, an industrial air staged not premixed down fired burner with 1.1 MW duty was fired with a blend of two fuels, natural gas and pressure swing adsorption (PSA) off gas (e.g. hydrogen). The composition of the feed of fuel fed to the combustion device for this experiment is shown below in Table 1:

TABLE 1

Fuel composition for a first set of testing

| Fuel Constituents | Concentration (Mol %) |
|---|---|
| Natural gas | 22.0 |
| Hydrogen (H2) | 25.2 |
| CO2 | 50.8 |
| N2 | 2.0 |

The fuel composition had a molecular weight of 27.25, a lower heating value (LHV) of 9,107 KJ/kg and a theoretical air requirement of 2.8243 on a volume to volume basis (vol/vol) for complete combustion.

Ambient air was utilized as an oxidant for comparison with an embodiment using synthetic air. The ambient air had typical air concentrations (e.g. 20-21 mol % oxygen, 78-79 mol % nitrogen, trace amounts of CO2, water, and Ar, etc.). The synthetic air composition used in the testing is shown in the below Table 2:

TABLE 2

Synthetic Air composition for the first set of testing

| Synthetic Air Constituents | Concentration (Mol %) |
|---|---|
| CO2 | 35.27 |
| Ar | 1.8 |
| O2 | 26.01 |
| N2 | 8.32 |
| Water (H2O) | 28.60 |

In the conducted experimentation, when air was utilized as the oxidant, NOx emissions of 25 parts per million (ppm) was produced. In contrast, use of the synthetic air provided a 95% reduction in NOx emissions (e.g. 2.5 ppm NOX was produced).

Additional testing was performed to evaluate different fuel compositions and use of different oxygen compositions in the synthetic air to evaluate how that may affect NOx formation. With oxygen content was adjusted to 22 mol % and 28 mol %, the NOx emissions were found to be 2.8 mg/Nm$^3$ and 2.6 mg/Nm$^3$, respectively, from the combustion of the fuel. In contrast, the use of air with the same fuel resulted in formation of 65.7 mg/Nm$^3$ of NOx from the combustion of the fuel. This further shows that use of the synthetic air in embodiments of our process and apparatus can provide a greater than 95% reduction in NOx.

Testing was also conducted to evaluate the impact burner duty could have on NOx emission using synthetic air as the oxidant for the fuel. Our testing found that at 40% burner duty, only 6.1 mg/Nm$^3$ of NOx would be formed, which provides about an 80% reduction in NOx as compared to ambient air being used as the oxidant. For other higher duties, it was found that NOx formation would be under 3 mg/Nm$^3$. For example, at a duty of 60%, synthetic air use resulted in NOx formation of 2.6 mg/Nm$^3$ and at 80% and 120% duties, the use of synthetic air as the oxidant resulted in NOx formation of 0.8 mg/Nm$^3$. This type of low NOx formation provides a substantial reduction in NOx formation as compared to ambient air (e.g. greater than an 80% reduction to a greater than 95% reduction in NOx). This conducted testing also showed that the use of synthetic air helped provide a reduction in flame length by about 10% as compared to use of ambient air as the oxidant. Our conducted testing also showed that varying oxygen content within the synthetic air from 22 mol % to 28 mol % had no meaningful impact on adiabatic flame temperature or flame length and emissions.

These experimental results were very surprising. In an oxygen enriched atmosphere with a relatively large amount of nitrogen, higher NOx emissions would have been expected near the flame where temperature may increase as compared to atmospheric combustion. Also, even though N2 in synthetic air can be much lower than that in ambient air, it is still in sufficient amount for O2-enriched atmosphere to expect high NOx emissions near the flame where temperature may increase as compared to atmospheric combustion. While thermal and chemical action of water are known to help inhibit NOx formation, the results of the conducted testing showed that the NOx emissions using synthetic air are substantially and surprisingly reduced and can provide such a substantial reduction along a wide range of N2, CO2, and water compositions within the synthetic air. In fact, NOx emissions can be substantially reduced even without water being present or steam being injected.

Over time, a combustion device 3 in use can result in air ingress into the combustion device. This can occur due to seals wearing and other factors. Embodiments of our apparatus and process in which the source of gas for the synthetic air is recycled flue gas RF that is recycled from the combustion device 3 may result in the synthetic air having a higher N2 content over time as a result of this condition. While that may occur, it was still surprisingly found that even after a long period of use, the N2 concentration of the synthetic air could be under 20 mol % after a substantial continuous period of operation and still provide a reduction in NOx formation of between 95% and 75% over the duration of operation. And such a reduction in NOx can also be provided with improved carbon capture as discussed above. Further, the reduction in NOx and improved CO2 recovery can be provided without having to incur additional costs or operational risk associated with catalytic reduction (e.g. no need for risking an ammonia slip as discussed above, etc.). The improved reduction in NOx can also be provided irrespective of whether advanced burners are utilized or not in the combustion device 3.

Embodiments of our process, apparatus, and system can be adapted for different design criteria. For example, it should be appreciated that other embodiments can utilize different types of conduit arrangements, fuel storage tanks or fuel pipelines, oxygen storage tanks or oxygen producing process units, combustion device arrangements, and/or types of fuel (e.g. natural gas, oil, diesel, coal, hydrogen, etc.,).

It should also be appreciated that other modifications can also be made to meet a particular set of criteria for different embodiments of the apparatus or process. For instance, the arrangement of valves, piping, and other conduit elements (e.g., conduit connection mechanisms, tubing, seals, valves, etc.) for interconnecting different units of the apparatus for fluid communication of the flows of fluid between different elements (e.g., compressors, fans, valves, conduits, etc.) can be arranged to meet a particular plant layout design that accounts for available area of the apparatus, sized equipment of the apparatus, and other design considerations. As another example, the flow rate, pressure, and temperature of the fluid passed through the various apparatus or system elements can vary to account for different design configurations and other design criteria. As yet another example, the length L, width W, or height H of the mixing device conduit 8 can be configured for a particular application or installation. In some embodiments, the conduit shape can be rectangular. However, it is contemplated that other embodiments may utilize other shaped conduits.

As yet another example, embodiments of the apparatus and process can each be configured to include process control elements positioned and configured to monitor and control operations (e.g., temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.). It should be appreciated that embodiments can utilize a distributed control system (DCS) for implementation of one or more processes and/or controlling operations of an apparatus or process as well.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the process, apparatus, system, and methods of making and using the same have been shown and described above, it is to be distinctly understood that the invention is not limited thereto but may be otherwise variously embodied and practiced within the scope of the following claims.

What is claimed is:

1. An apparatus for oxidant formation comprising:
    a mixing device positionable and configured to receive a carrier gas from at least one source of gas and/or flue gas recycled from a combustion device, the mixing device also positionable and configured to receive oxygen from a source of oxygen for injecting the oxygen into the carrier gas to form an oxidant for feeding to the combustion device;

the mixing device comprising a plurality of injection devices positioned within a conduit of the mixing device, the injection devices positionable downstream of at least one flow conditioning device such that the carrier gas is passable through the at least one flow conditioning device before passing along the injection devices; and the injection devices are positioned and configured to inject the oxygen into the carrier gas to form the oxidant;

wherein the injection devices comprise a central region of injection devices, a first outer region of injection devices positioned between the central region of the injection devices and a first sidewall of the conduit and a second outer region of injection devices positioned between the central region of the injection devices and a second sidewall of the conduit;

wherein the central region of injection devices are positioned between the first outer region of injection devices and the second outer region of injection devices;

each of the injection devices of the central region of injection devices is configured to inject a mass flow rate of oxygen into the carrier gas via a central region injection rate, each of the injection devices of the first outer region of injection devices is configured to inject a mass flow rate of oxygen into the carrier gas via an outer region injection rate, each of the injection devices of the second outer region of injection devices is configured to inject a mass flow rate of oxygen into the carrier gas via the outer region injection rate, and the central region injection rate being at least 10% greater than the outer region injection rate.

2. The apparatus of claim 1, wherein a mass flow rate of oxygen injectable into the carrier gas via the central region of injection devices is between 30% and 60% of an overall mass flow rate of oxygen injectable into the carrier gas, a mass flow rate of oxygen injectable into the carrier gas by the first outer region of injection devices is between 20% and 40% of the overall mass flow rate of oxygen injectable into the carrier gas, and a mass flow rate of oxygen injectable into the carrier gas by the second outer region of injection devices is between 20% and 40% of the overall mass flow rate of oxygen injectable into the carrier gas.

3. The apparatus of claim 2, wherein the mass flow rate of oxygen injectable into the carrier gas by the second outer region of injection devices is equal to the mass flow rate of oxygen injectable into the carrier gas by the first outer region of injection devices.

4. The apparatus of claim 1, wherein the conduit has a duct aspect ratio of between 3.5 and 5.

5. The apparatus of claim 1, wherein the conduit has a duct aspect ratio that is greater than 3.

6. The apparatus of claim 1, comprising the at least one flow conditioning device.

7. The apparatus of claim 6, wherein the at least one flow conditioning device includes a perforated plate positioned within the conduit upstream of the injection devices, the perforated plate having a thickness and a plurality of holes, each of the holes having a hole diameter;

wherein a ratio of the thickness of the perforated plate to the hole diameter is between 0.3 and 1.

8. The apparatus of claim 7, wherein the perforated plate is positioned downstream of a carrier gas flow device or a flow disturbance component at a distance between a value that is equal to half of a height of the conduit and a value that is triple the height of the conduit.

9. The apparatus of claim 1, wherein the plurality of injection devices are in a staggered configuration within the conduit.

10. The apparatus of claim 1, wherein the plurality of injection devices are arranged in a plurality of rows.

11. The apparatus of claim 1, wherein the plurality of injection devices comprise a plurality of oxygen injection apertures along a periphery or circumference of the injection devices.

* * * * *